United States Patent
Tobata

(10) Patent No.: US 6,959,613 B2
(45) Date of Patent: Nov. 1, 2005

(54) SEATBELT APPARATUS FOR VEHICLE

(75) Inventor: Hideo Tobata, Yokosuka (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/686,566

(22) Filed: Oct. 17, 2003

(65) Prior Publication Data

US 2004/0083824 A1      May 6, 2004

(30) Foreign Application Priority Data

Oct. 31, 2002   (JP)   .......................... P2002-318113

(51) Int. Cl.$^7$ .............................................. G01L 1/26
(52) U.S. Cl. ............................................... 73/862.391
(58) Field of Search ....................... 73/862.391, 862.44

(56) References Cited

U.S. PATENT DOCUMENTS

| | | | |
|---|---|---|---|
| 5,765,774 A * | 6/1998 | Maekawa et al. ........... | 280/807 |
| 6,374,168 B1 * | 4/2002 | Fujii ........................... | 280/735 |
| 6,658,336 B2 * | 12/2003 | Browne et al. ............. | 280/731 |
| 6,722,698 B2 * | 4/2004 | Viano et al. ................ | 280/806 |
| 2002/0014767 A1 | 2/2002 | Class et al. | |

FOREIGN PATENT DOCUMENTS

| | | |
|---|---|---|
| DE | 100 10 239 A1 | 9/2001 |
| EP | 0 800 970 A1 | 10/1997 |
| EP | 1 122 136 A2 | 8/2001 |
| JP | 10-338111 | 12/1998 |
| JP | 2000-177535 | 6/2000 |
| JP | P2000-177535 A | 6/2000 |
| JP | 2002-2450 | 1/2002 |
| JP | P2002-2450 A | 1/2002 |

\* cited by examiner

*Primary Examiner*—Max Noori
(74) *Attorney, Agent, or Firm*—McDermott Will & Emery LLP

(57) ABSTRACT

A seatbelt apparatus includes a first pretensioner for winding a webbing to a retractor by a predetermined tension, a second pretensioner for applying a tension to the webbing in an emergency to restrain a passenger finally, a brake-pedal stroke sensor for detecting a manipulated amount of a brake pedal, a laser radar for detecting an obstacle in front of a vehicle and a first controller for controlling the tension by the first pretensioner in accordance with at least one of a tension control based on the detection data by the brake-pedal stroke sensor and another tension control based on the detection data by the laser radar. In operation, under the tension control based on detection data by the brake-pedal stroke sensor, the first controller allows the first pretensioner to always operate when it is judged that the vehicle is braking in an emergency. Under the tension control based on detection data by the laser radar, the first controller allows the first pretensioner to operate selectively.

21 Claims, 25 Drawing Sheets

SEATBELT APPARATUS FOR VEHICLE

BACKGROUND OF THE INVENTION

1. Field of the Invention

The present invention relates to a seatbelt apparatus for a vehicle. More particularly, the invention relates to a seatbelt apparatus which is equipped with a pretensioner for adjusting a tension of an automotive seatbelt and also adapted so as to rewind the seatbelt at a vehicle's abrupt braking or when its abnormal access to an obstacle is anticipated thereby to avoid a risk on a driver (or a passenger).

2. Description of Related Art

As the conventional seatbelt apparatus for a vehicle, Japanese Patent Application Laid-open No. 2002-2450 discloses a seatbelt apparatus which does not rewind a seatbelt in a normal state but drives a motor for a pretensioner to rewind the seatbelt when an abnormality is generated in the circumference about a vehicle. Noted that the above abnormality means that it is expected that a driver's (or passenger's) own vehicle approaches the preceding vehicle abnormally by a relative speed and a distance between the own vehicle and the preceding vehicle contains, a built-in acceleration meter detects a great deceleration of the own vehicle, a slip sensor detects a slipping of the driver's own vehicle and so on.

Japanese Patent Application Laid-open No. 2000-177535 discloses another seatbelt apparatus that controls a tension of a seatbelt corresponding to a vehicle's traveling condition.

SUMMARY OF THE INVENTION

However, above-mentioned seatbelt apparatuses are often equipped with a driver's sudden deceleration (break operation) sensor or an unusual approaching sensor that calculates margin time to an advanced vehicle by a radar system, as a vehicle risk prediction detector. And when the sensors act independently each other, tension growth frequency of the seat belt will drastically be increased and will give unusual feeling to the driver.

Therefore, it is an object of the present invention to provide a seatbelt apparatus for a vehicle, which does not afford a driver a sense of incompatibility while avoiding a risk on the driver.

According to the present invention, the above-mentioned object is accomplished by a seatbelt apparatus for a vehicle, comprising: a webbing for restraining a passenger seated on a seat; a retractor for winding and rewinding the webbing; a first pretensioner for winding the webbing to the retractor by a first tension; a second pretensioner for applying a second tension to the webbing in an emergency about the vehicle to restrain the passenger; a manipulated brake detecting unit for detecting a manipulated amount of a brake pedal of the vehicle; an obstacle detecting unit for detecting an obstacle in front of the vehicle; and a control unit for controlling the first tension by the first pretensioner in accordance with at least one of a tension control based on detection data by the manipulated brake detecting unit and another tension control based on detection data by the obstacle detecting unit. In the above-constructed seatbelt apparatus, under the tension control based on detection data by the manipulated brake detecting unit, the control unit allows the first pretensioner to always operate when it is judged that the vehicle is braking in an emergency. While, under the tension control based on detection data by the obstacle detecting unit, the control unit allows the first pretensioner to operate selectively.

DETAILED DESCRIPTION OF THE PREFERRED EMBODIMENT

Referring to accompanying drawings, various embodiments of the present invention will be described below.

Figure 1:
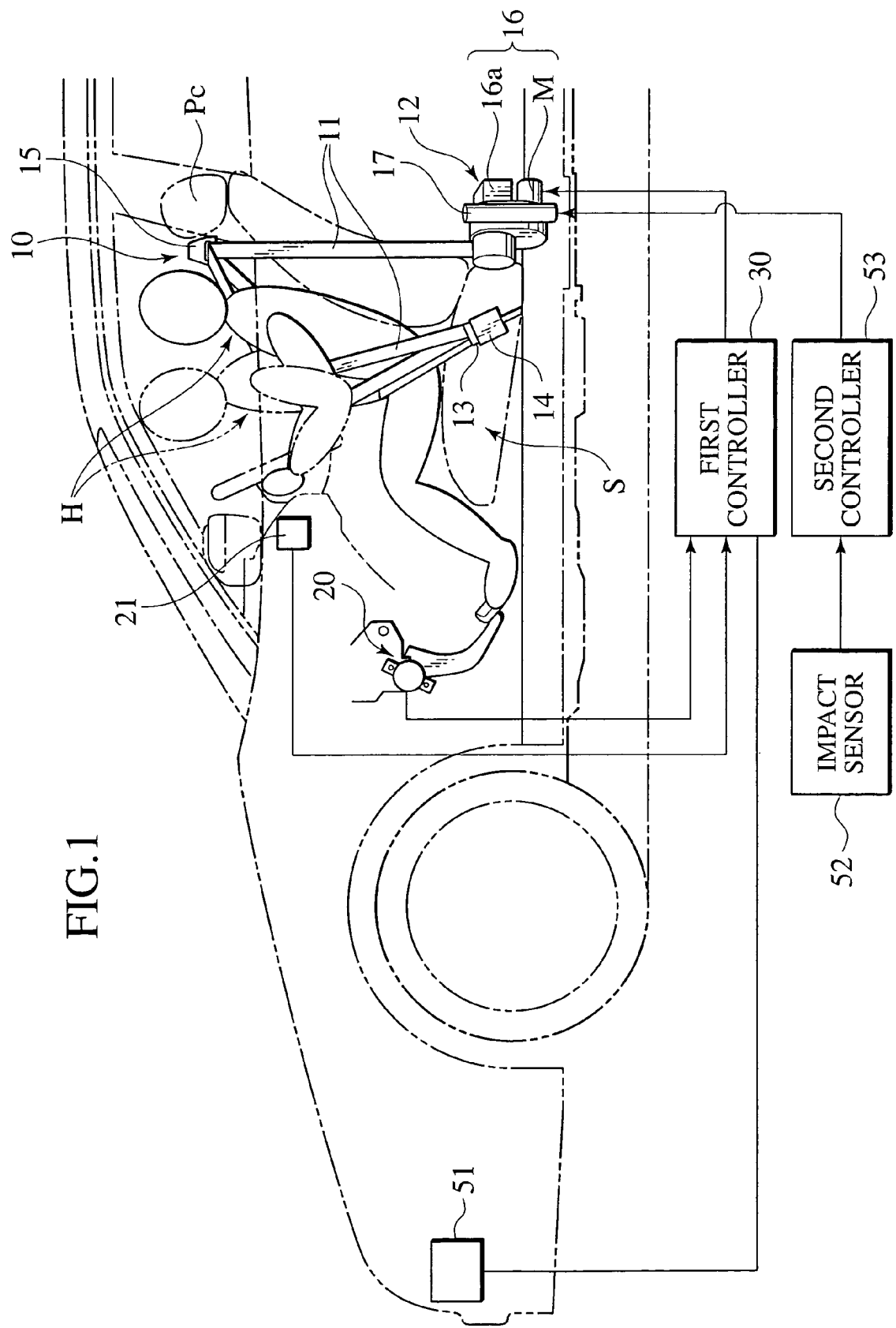
FIG. 1 is a view explaining the arrangement of constituents of a seatbelt control apparatus in accordance with an embodiment of the present invention.

FIG. 1 shows the constitution of a seatbelt apparatus of the first embodiment of the invention.

As shown in FIG. 1, a seatbelt apparatus by example of a three-point suspension passive seatbelt includes a webbing 11 for restraining a passenger H seated on a seat S and a retractor 12 for winding one side of the webbing 11. The other end of the webbing 11 is fixed to a vehicle body through an anchor (not shown) on one side of the seat S close to an automotive door. A tongue 13 is movably fitted to an intermediate portion of the webbing 11 and detachably engaged with a buckle 14 fixed to the vehicle body, on the other side of the seat S close to a body's center in the direction of width of the vehicle body. Between the buckle 14 and the above retractor 12, the webbing 11 is movably supported by a through ring 15 on the upper part of a center pillar Pc.

The retractor 12 is provided with a first pretensioner 16 for winding the webbing 11 to the retractor 12 or rewinding the webbing 11 from the retractor 12 and a second pretensioner 12 that applies a tension (i.e. the second tension of the invention) to the webbing 11 to finally restrain the passenger H if an emergency arises.

The first pretensioner 16 comprises a motor M and a reduction gear unit 16a and is adapted so as to transmit a torque as a result of reducing the revolutions of the motor M to a reel (not shown) disposed in the retractor 12 to wind the webbing 11.

In this embodiment, the second pretensioner 17 is in the form of an explosion-type pretensioner and is adapted so as to instantly wind the webbing 11 into the retractor 12 due to explosion of filling powder when detecting a collision.

Noted that the second pretensioner 17 is not limited to the explosion-type pretensioner only and may adopt a motor or the like so long as it can wind the webbing 11 rapidly.

The retractor 12 is provided with a load force limiter to prevent the passenger H from being subjected to a large burden as a result that a tension of the webbing 11 wound at a collision exceeds a predetermined value. The retractor 12 is further equipped with a locking mechanism that detects an abrupt drawing out of the webbing 11 and locks up the withdrawal of the webbing 11.

When a vehicle has a collision, the locking mechanism serves to restrain a passenger's body on the seat and simultaneously, the second pretensioner 17 acts to eliminate a slack of the webbing 11 to improve the restrictive capability for the passenger H. Further, the above load force limiter acts to keep a seatbelt force applied on the passenger's body below a predetermined value.

The seatbelt apparatus 10 of this embodiment further includes a first controller 30 for controlling the first pretensioner 16 and a second controller 53 for controlling the second pretensioner 17.

The first controller 30 controls the first pretensioner 16, based on a brake-stroke signal outputted from by a brake-pedal stroke sensor 20 (i.e. the manipulated brake detecting unit of the invention) for detecting a driver's (passenger H) manipulated amount of a brake pedal, a detection signal from a vehicle speed sensor 21 and a detection signal from a laser radar 51 (i.e. the obstacle detecting unit of the invention) installed in the front part of the vehicle to detect a distance between the passenger's vehicle and the preceding vehicle (not shown). Noted that the laser radar 51 may be replaced by a millimeter wave radar or an ultrasonic wave radar.

On the other hand, the second controller 53 controls the second pretensioner 17, based on a detection signal from a collision sensor 52 for detecting an impact at a vehicle's collision.

Figure 2:
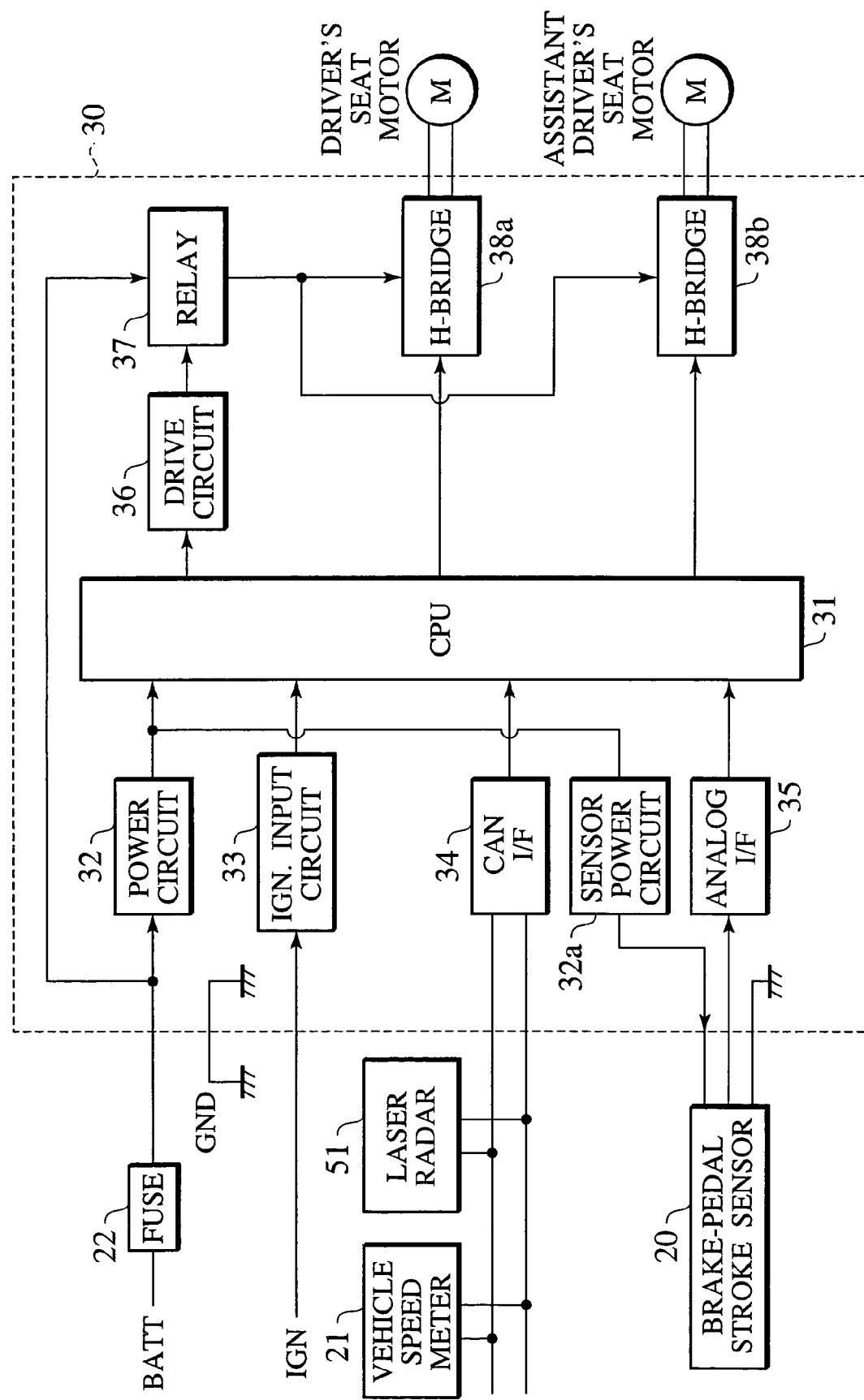
FIG. 2 is a block diagram showing the constitution of the seatbelt control apparatus in accordance with the embodiment of the present invention.

FIG. 2 shows a functional block diagram showing the detailed constitution of the first controller 30. Noted that the constitution of the second controller 53 is similar to those of the first controller 30.

As it will be understood obviously from the figure, the controller 30 is associated with two motors M for the first pretensioners 16: one motor for the seatbelt apparatus 10 for the driver's seat; and the other motor for the seatbelt apparatus 10 for the assistant driver's seat.

As shown in FIG. 2, the first controller 30 comprises a CPU (central processing unit) 31, a power circuit 32 for supplying the CPU 31 with an electrical power through a fuse 22, an IGN (ignition) input circuit 33 for inputting an ignition signal, a CAN (Controller Area Network)•I/F (interface) 34 for inputting a vehicle-speed signal from the vehicle speed sensor 21 and an Analog•I/F 35 for inputting a brake-stroke signal from the brake-pedal stroke sensor 20.

Noted that a voltage stabilized by the power circuit 32 is introduced to not only the CPU 31 but also the brake-pedal stroke sensor 20 through a sensor power circuit 32a.

Control signals are fed from the CPU 31 to a relay 37 through a drive circuit 36 and also fed to H-Bridges 38a, 38b for controlling the drive of the motors M and further switching the rotating directions of the motors M.

The voltage fed from the fuse 22 to the power circuit 32 is applied to the H-Bridges 38a, 38b through the relay 37. The rotating directions of the respective motors M for the driver's seat and the assistant driver's seat are controlled by the H-Bridges 38a, 38b. Further, the rotating speeds of these motors M are controlled in accordance with respective duty ratios calculated by the CPU 35. Noted that the duty ratio will be referred as "duty", hereinafter.

The brake-pedal stroke sensor 20 can detect a driver's stepping amount on the brake pedal to be manipulated by a driver by means of a rotating angle of a potentiometer. The brake-pedal stroke sensor 20 converts a power voltage supplied from a sensor power circuit 32a to a voltage corresponding to the driver's stepping amount and further outputs the voltage signal to the CPU 31 through the Analog•I/F 35.

The data about vehicle speed detected by the vehicle speed sensor 21 is inputted to the CPU 31 through the CAN•I/F (interface) 34. Otherwise, without passing through the CAN•I/F 34, the vehicle speed sensor 21 may be constructed so as to output periodic pulses with a cycle corresponding to the vehicle speed. Then, the vehicle speed can be calculated by the periodic pulses.

Based on a detection signal from the brake-pedal stroke sensor 20, the CPU 31 judges whether the present braking is an urgent braking (either soft braking or hard braking both mentioned later) or not. If the present braking is an urgent braking, then the CPU 31 judges that the driver has operated a brake pedal in order to avoid a vehicle collision and outputs command currents to the H-Bridges 38a, 38b in the form of duty ratios. In this way, the revolutions of the motors M are controlled so as to advance the winding operation of the webbings 11.

Further, the detection signal from the laser radar 51 enables calculation of a distance between a driver's vehicle and an obstacle in from of the vehicle and a relative speed therebetween. Based on these calculation data (distance and relative speed), the possibility of a vehicle's abnormal access to the obstacle is judged. If it is judged that the possibility of abnormal access is high, motor currents from the respective H-bridges 38a, 38b are duty-controlled in order to roll up the webbings 11.

For malfunctions of the respective sensors for detecting a brake-pedal stroke, a radar signal and a vehicle speed for the first controller 30, it has a fail-safe function to detect the malfunctions. Thus, in accordance with this fail-safe logic, the first controller 30 stops the supply of currents for the motors M.

Figure 3:
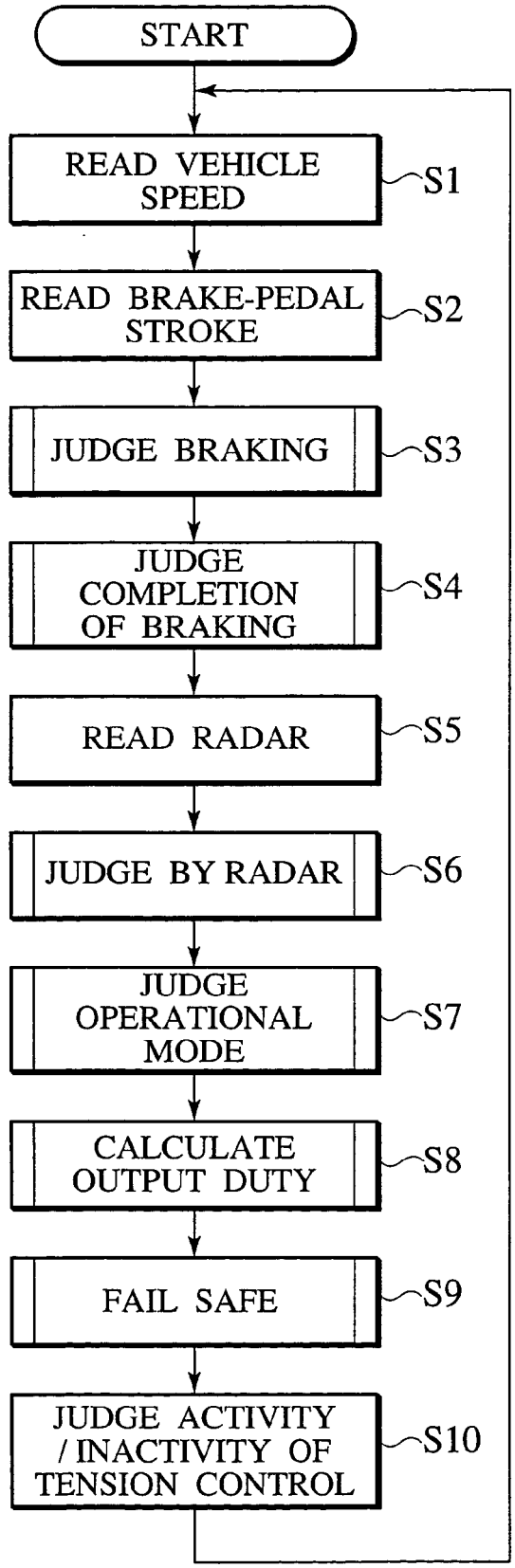
FIG. 3 is a flow chart showing the overall procedure of the seatbelt control apparatus in accordance with the embodiment of the present invention.

The operation of the seatbelt apparatus 10 of this embodiment will be described below. FIG. 3 is a flow chart showing the whole operation of the seatbelt apparatus 10 of this embodiment. FIGS. 4 to 9 show respective flow charts explaining the details of the operation.

During the vehicle's traveling, at step S1, the CPU 31 reads a traveling speed of the related vehicle detected by the vehicle speed sensor 21, through the CAN•I/F 34. Next, at step S2, the CPU 31 reads a stroke amount of the brake pedal (stepping amount) detected by the brake-pedal stroke sensor 20, through the Analog•I/F 35.

At step S3, it is executed to judge whether the vehicle is being at an urgent braking, based on so-obtained data of the vehicle speed and the stroke amount of the brake pedal. For example, if an obstacle suddenly appears in front of a vehicle during its traveling or when a driver finds out an obstacle with delay, the driver is in the habit of braking the vehicle quickly in order to avoid a vehicle collision. Therefore, the output signal of the brake-pedal stroke sensor 20 enables detection of an occurrence of urgent braking.

At step S4, it is executed to judge whether an urgent braking has been completed or not. Hereat, for example, if a vehicle is at a standstill, the vehicle speed is generally constant or a vehicle is accelerating, then it is judged that the urgent braking has been completed.

At step S5, the CPU 31 reads data about the distance between the vehicle and an obstacle detected by the laser radar 51. At next step S6, based on this detection data by the laser radar 51, it is executed to judge whether a driver's vehicle is approaching the front obstacle (e.g. a preceding vehicle) abnormally.

At step S7, based on the judgment at step S3 and the judgment at step S6, it is carried out to select an operational mode to determine the control for the seatbelt. That is, there is selected either an operational mode to control the seatbelt on a basis of the judgment of whether the vehicle is at an urgent braking or another operational mode to control the seatbelt on a basis of the distance between the vehicle and the obstacle.

At step S8, it is carried out calculate an output duty (ratio) in accordance with the so-selected operational mode.

At next step S9, it is executed in accordance with the fail-safe logic to perform a process to stop supplying the motors M with voltage if judged that any one of the sensors etc. has a malfunction.

At step S10, it is executed to judge whether the seatbelt control is activated or inactivated on a basis of both fail-safe and prohibitive conditions. Thereafter, the routine returns to step S1.

Figure 4:
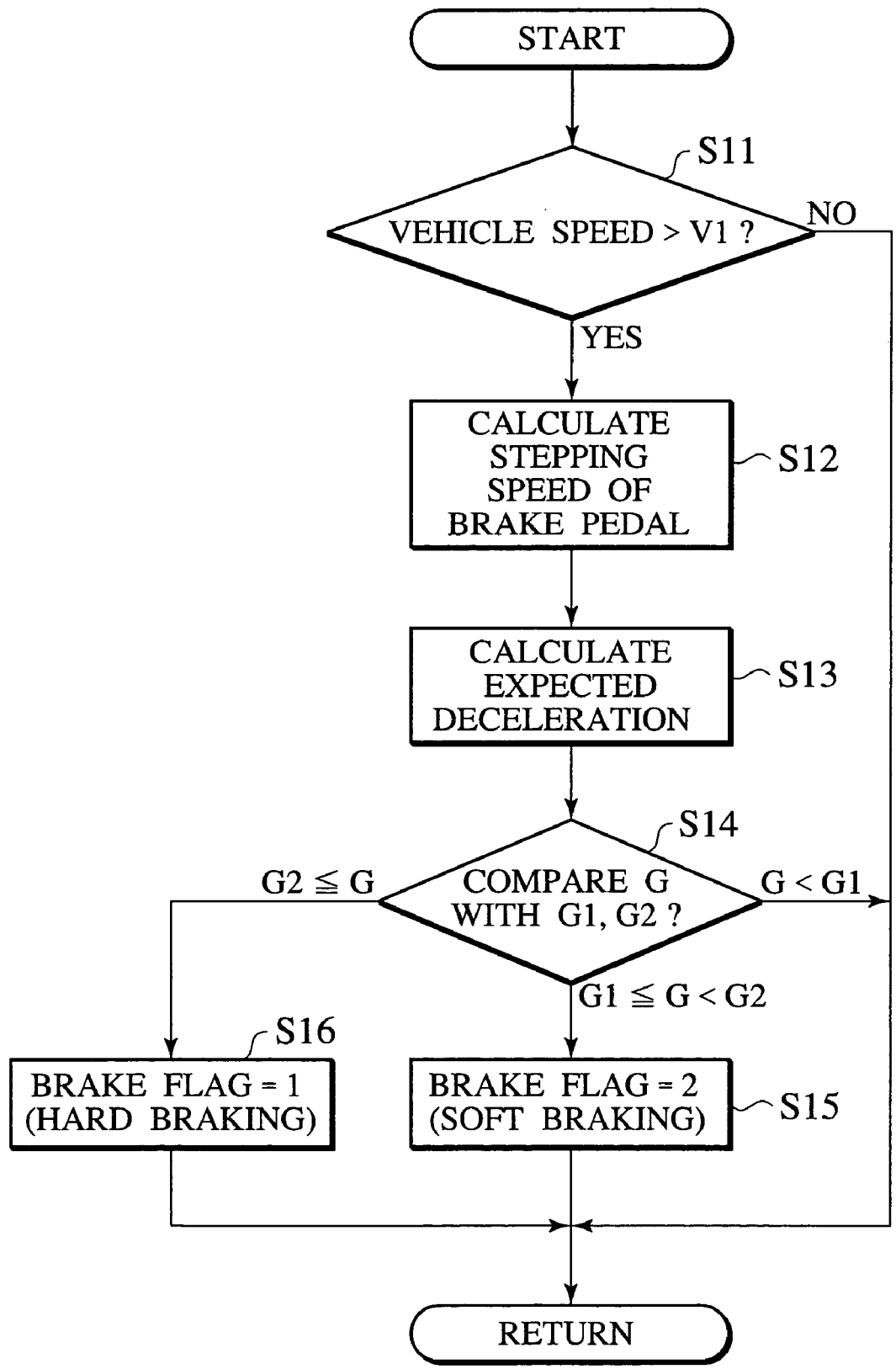
FIG. 4 is a flow chart showing the procedure of judging a braking.

FIG. 4 is a flow chart showing the detailed procedure of the above judgment of urgent braking. First, at step S11, it is executed to judge whether a traveling speed of the vehicle is more than a predetermined speed V1. If the judgment at step S11 is No, that is, the vehicle speed is equal to or less than the speed V1, then the tension control of the webbing 11 is not performed since there is no driver's manipulation to brake the vehicle in an emergency.

While, if the vehicle speed is more than the speed V1 ("Yes" at step S11), then the routine goes to step S12 to calculate a driver's stepping speed on the brake pedal. Noted that the driver's stepping speed can be obtained by the detection signal from the brake-pedal stroke sensor 20.

Again noted that if an obstacle suddenly appears in front of a vehicle during its traveling or when a driver finds out an obstacle with delay, the driver is in the habit of braking the vehicle quickly in order to avoid a vehicle collision. This driver's braking manipulation is detected by the brake-pedal stroke sensor 20.

At next step S13, based on the stroke amount (a driver's stepping amount) of the brake pedal and the above stepping speed of the brake pedal, it is executed to calculate an expected deceleration value G (negative deceleration) that is expected by the driver.

At next step S14, it is exacted to compare the expected deceleration value G with two threshold values G1, G2 (G2>G1). If the expected deceleration value G is less than the threshold value G1 (G<G1), then the routine goes to step S17 to set a braking flag of "0", so that the tension control of the webbing 11 is not carried out.

On the other hand, if the relationship of "G1≦G<G2" is established, then the routine goes to step S15 where the braking flag of "2" is set as "soft braking flag". Again, if the relationship of "G2≦G" is established, then the routine goes to step S16 where the braking flag of "1" is set as "sharp braking flag".

Figure 5:
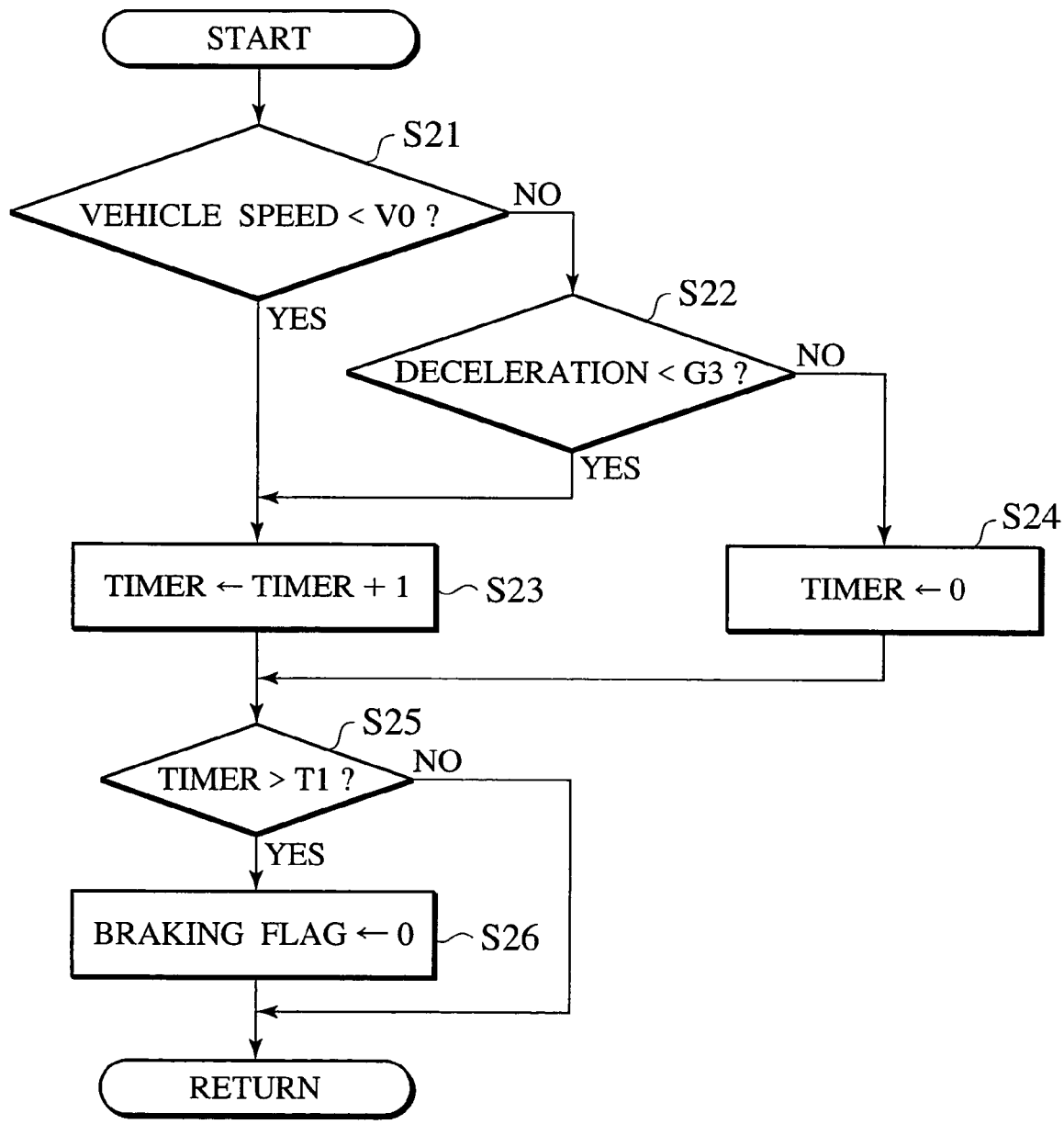
FIG. 5 is a flow chart showing the procedure of finishing the judgment of braking.

FIG. 5 is a flow chart showing the detailed procedure at step S4 of FIG. 3 to complete the judgment of urgent braking. First, at step S21, it is executed to judge whether a traveling speed of the vehicle is less than a predetermined speed V0. At step S21, if the vehicle speed is less than the speed V0 (Yes), the routine goes to step S23 to increase a variable "timer" since the vehicle is regarded as being at a standstill. On the other hand, if the judgment at step S21 is No, that is, the vehicle speed is equal to or more than the speed V0, then the routine goes to step S22 to compare the deceleration value with a predetermined deceleration G3. If the deceleration value is less than the predetermined deceleration G3, then the routine goes to step S23 to increase the variable "timer" since it is judged that the vehicle is traveling at a substantially constant speed or is accelerating.

On the other hand, if the deceleration value is more than the predetermined deceleration G3 (No at step S22), the routine goes to step S24 to reset "the timer", in other words, set the timer equal to "0".

Subsequently, at step S25, it is executed to compare the value of the variable "timer" with a predetermined value T1. If the value of the variable "timer" is more than the value T1, the routine goes to step S26 to reset the braking flag (i.e. the hard braking flag or the soft braking flag). While, if the value of the variable "timer" is equal to or less than the value T1, the braking flag is maintained as it is.

Here noted that the reason for waiting the "timer" exceeding the predetermined value T1 is as follows. That is, it is assumed that the vehicle speed may fall less than the speed V0 in a moment due to a lock on automotive tires etc. though the vehicle is not at a standstill or that the deceleration value may fall less than the deceleration G3 in a moment due to a pumping brake though the vehicle is braking. In such cases, owing to the above waiting, it becomes possible to prevent the tension control of the webbing 11 from being completed.

Figure 6:
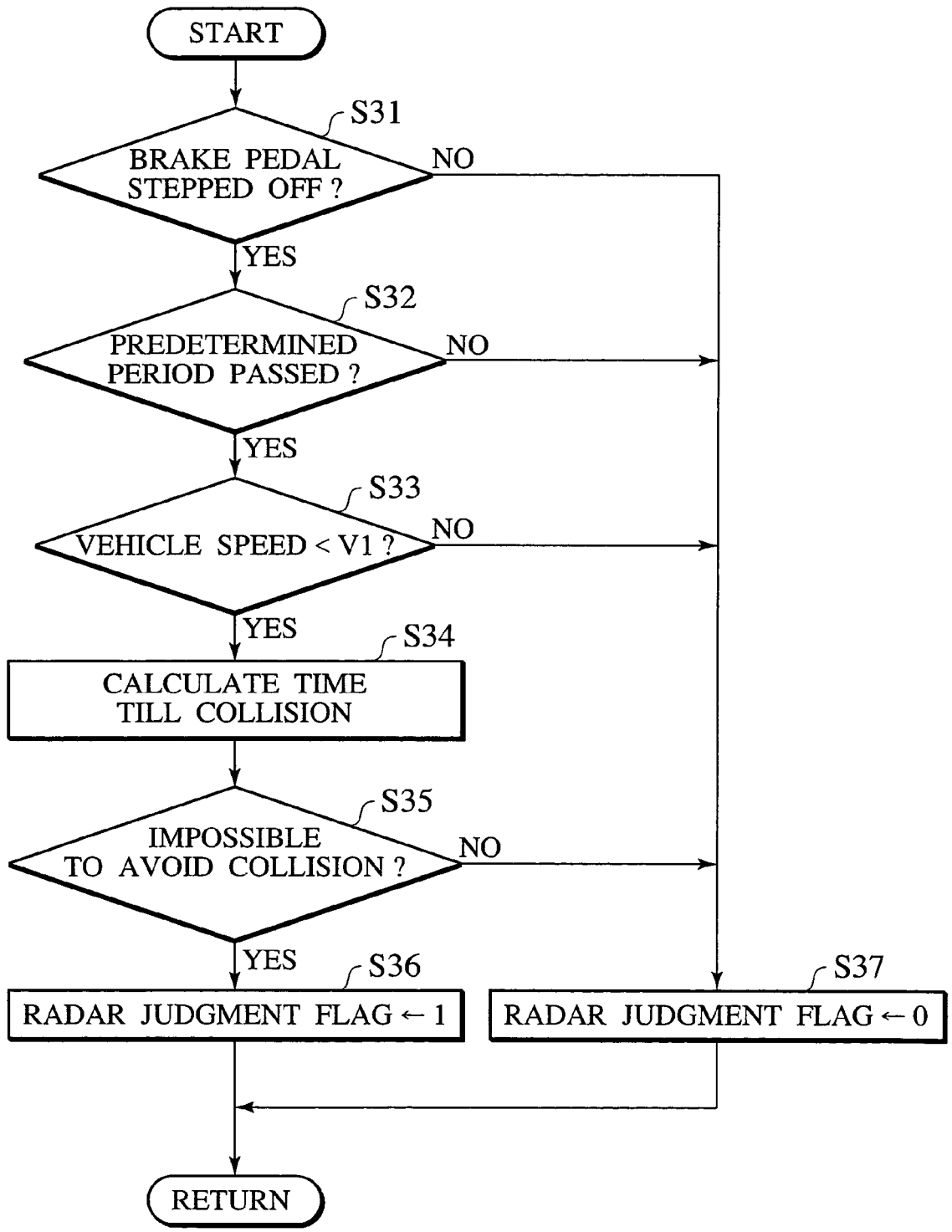
FIG. 6 is a flow chart showing the procedure of carrying out a radar judgment in accordance with the first embodiment of the invention.

FIG. 6 is a flow chart showing the detailed procedure of the above-mentioned radar judgment at step S6 of FIG. 3.

Irrespective of a driver's braking manipulation, if an obstacle appears in front of a driver's vehicle, then the laser radar 51 detects a distance from the radar 51 to the obstacle and its relative speed to the driver's vehicle.

Based on the detection signal from the brake-pedal stroke sensor 20, at step S31, it is executed to judge whether the driver has stepped off the brake pedal. If the brake pedal is not stepped off, the judgment at step S31 becomes "No" and the routine goes to step S37 to set a radar judgment flag of "0".

On the other hand, if it is judged that the driver has stepped off the brake pedal, the judgment at step S31 becomes "Yes" and the routine goes to step S32. At step S32, it is executed to judge whether a predetermined period has passed since the driver's stepping off the brake pedal. If the predetermined period has not passed yet, the routine goes to step S37 to set the radar judgment flag of "0".

While, if the predetermined period has passed, in other words, when the judgment at step S32 is Yes, the routine goes to step S33 to compare the present speed with the above speed V1. As a result, if the present speed is equal to or less than the speed V1, the judgment at step S33 becomes "No" and the routine goes to step S37 to set the radar judgment flag of "0".

When the present speed is more than the speed V1, the routine goes to step S34 to calculate a time to a collision with the obstacle in front or time when the driver's vehicle is expected to have the collision. At step S35, based on the so-calculated time, it is executed to judge whether it is impossible for the driver's vehicle to avoid a collision or not. If the time enables the vehicle to avoid the collision, the judgment at step S35 becomes "No" and the routine goes to step S37 to set the radar judgment flag of "0". To the contrary, if it is impossible for the driver's vehicle to avoid the collision, the routine goes to step S36 to set the radar judgment flag of "1".

Figure 7:
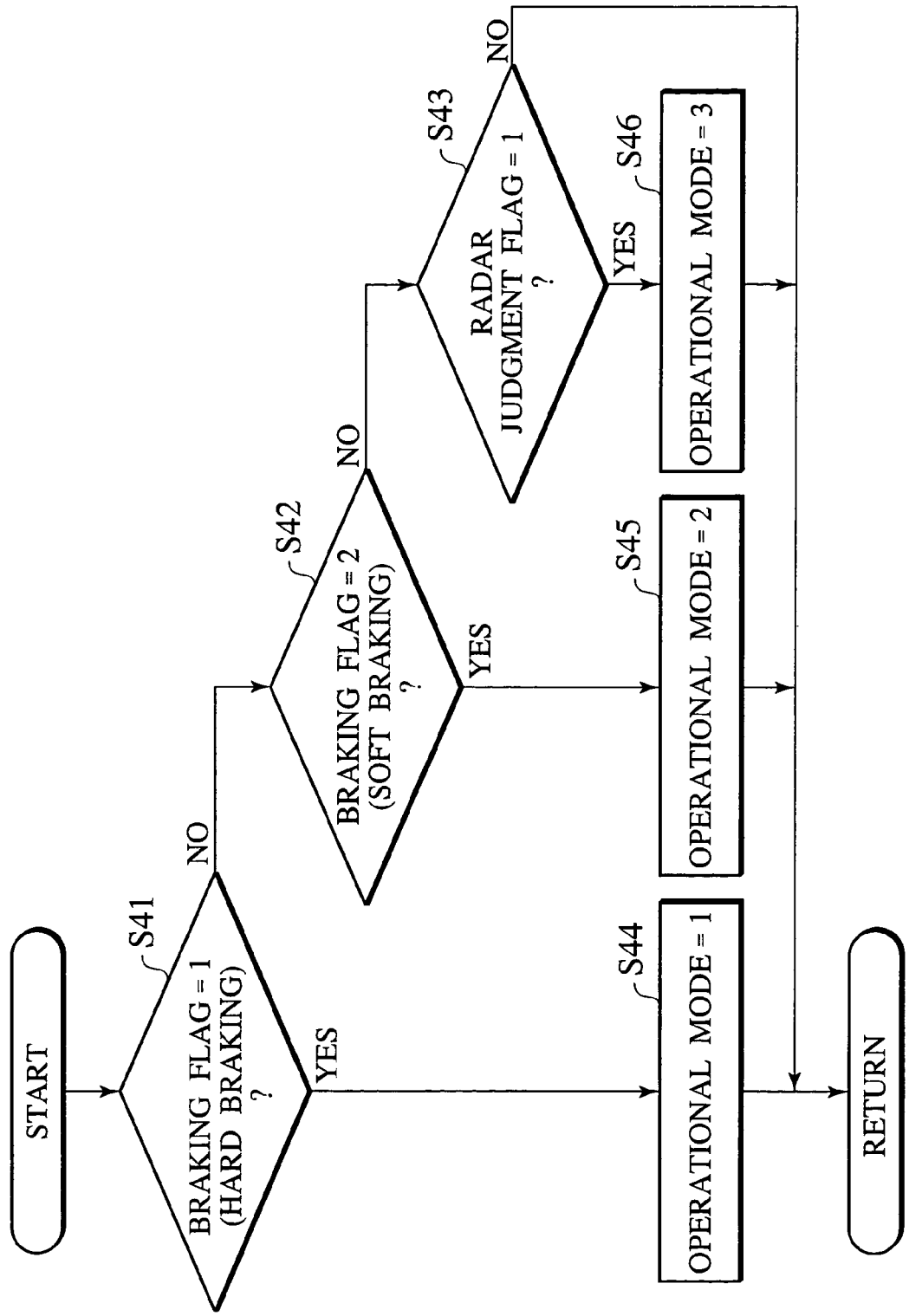
FIG. 7 is a flow chart showing the procedure of judging the operation mode.

FIG. 7 is a flow chart showing the detailed procedure of the operational mode judgment described at step S7 of FIG. 3. When the braking flag is set to "1" (i.e. case of hard braking) at step S16 of FIG. 4, the judgment at step S41 of FIG. 7 is "Yes" and then the routine goes to step S44 where the operational mode is set to "1".

While, when the braking flag is set to "2" (i.e. case of soft braking) at step S15 of FIG. 4, the judgment at step S41 of FIG. 7 is "No" and the judgment at step S42 is "Yes". Then, the routine goes to step S45 where the operational mode is set to "2". Moreover, when the radar judgment flag is set to "1" at step S35 of FIG. 6, the judgment at step S41 of FIG. 7 is "No" and the judgment at step S42 is also "No", while the judgment at step S43 is "Yes". Then, the routine goes to step S46 where the operational mode is set to "3".

Here noted that the above "operational mode" means how to control the tension of a seatbelt in rewinding it in the seatbelt apparatus, which will be described later.

Figure 8:
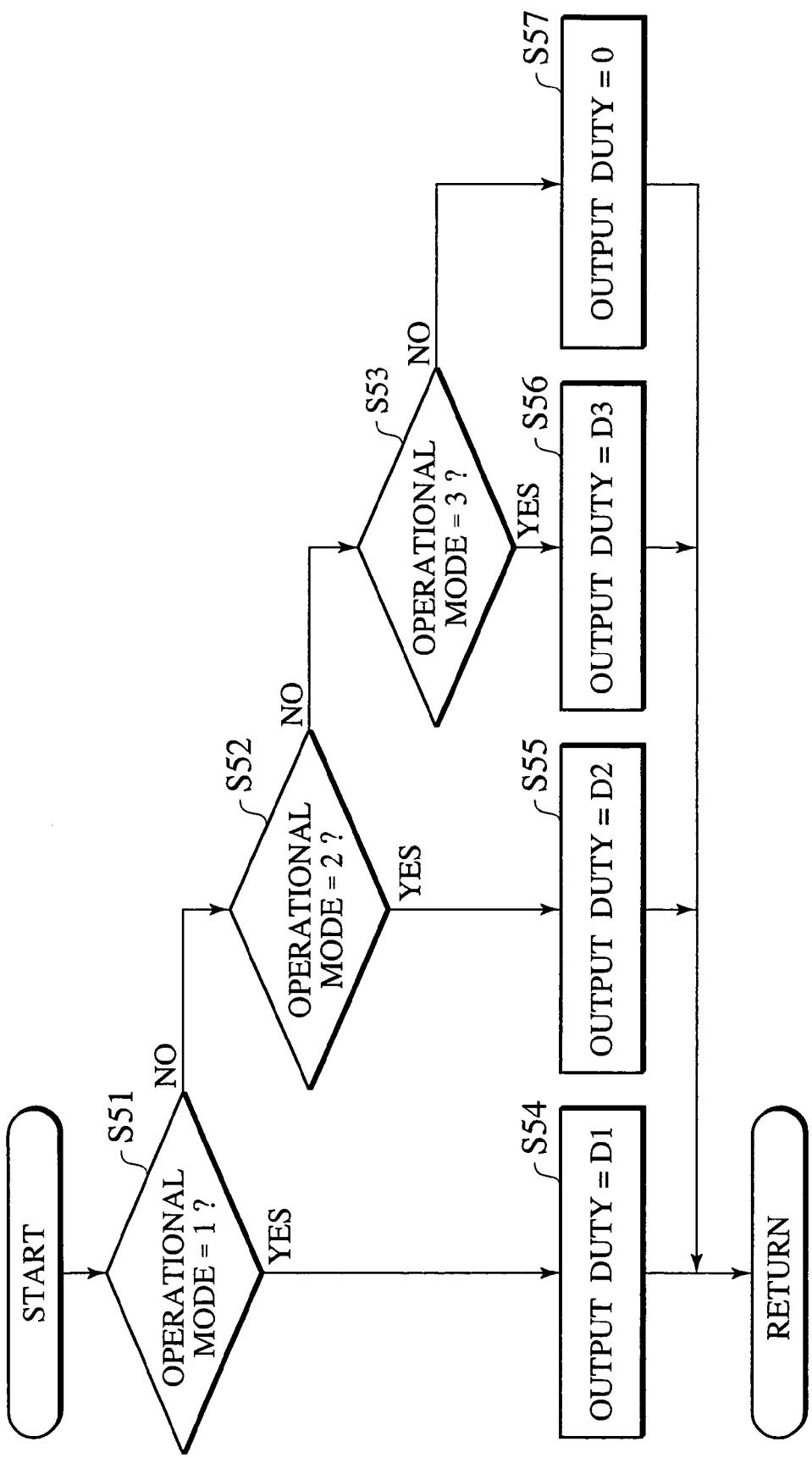
FIG. 8 is a flow chart showing the procedure of determining an output duty ratio.

FIG. 8 is a flow chart showing the detailed procedure of the calculation of "output duty" described at step S8 of FIG. 3. Here, the "output duty" (duty ratio) of pulse signals generated from the H-bridges 38a, 38b is determined on the ground of the operational mode obtained by the process of FIG. 7. In FIG. 8, if the operational mode is "1", the judgment at step S51 is "Yes" and then the routine goes to step S54 to establish the output duty of "D1".

While, if the operational mode is "2", then the judgment at step S51 is "No", while the judgment at step S52 is "Yes". Then, the routine goes to step S55 to establish the output duty of "D2". Moreover, if the operational mode is "3", then the judgments at steps S51 and S52 are together "No", while the judgment at step S53 is "Yes". Then, the routine goes to step S56 to establish the output duty of "D3". If no operational mode is established, all the judgments at steps S51, S52 and S53 become "No". Then, the routine goes to step S57 to establish the output duty of "0". That is, the tension control of the webbing 11 is not performed.

Figure 9:
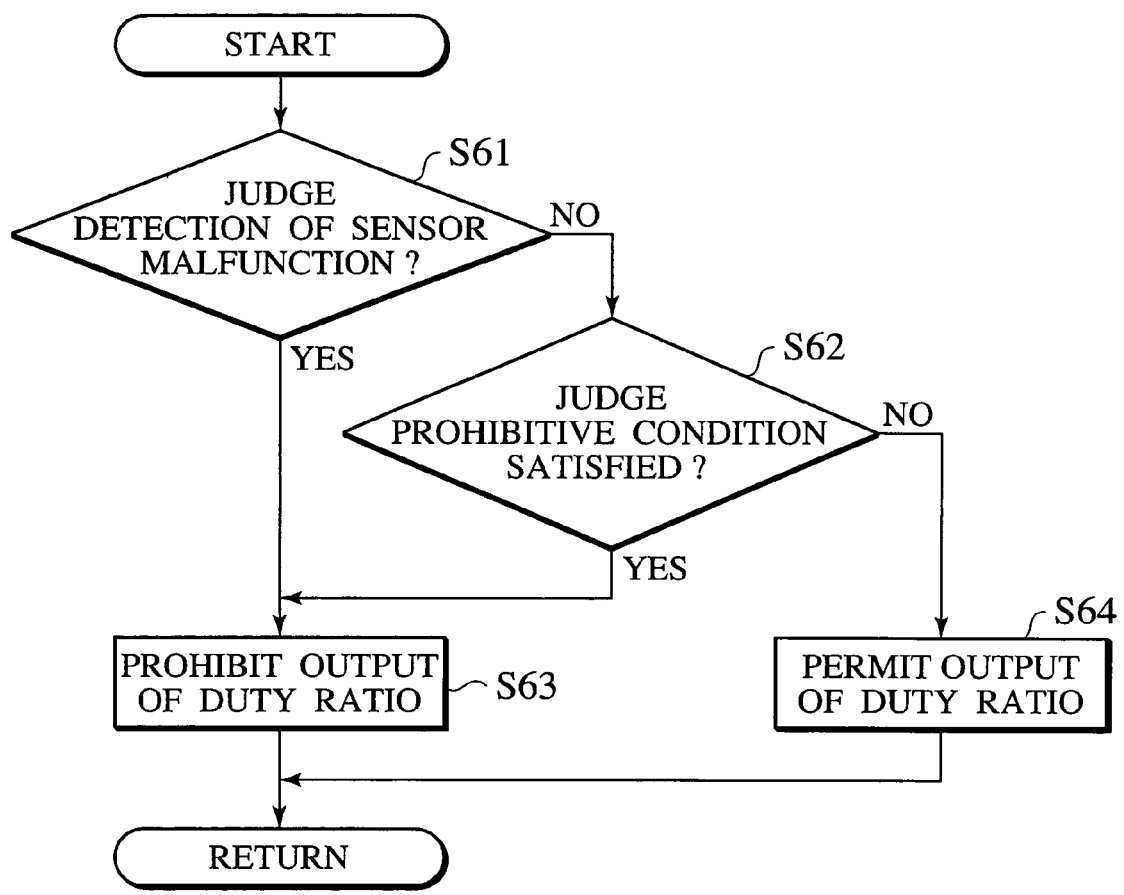
FIG. 9 is a flow chart showing the procedure of judging the admission of an output due to a fail-safe function.

FIG. 9 is a flow chart showing the detailed procedure of the fail-safe operation described at step S9 of FIG. 3. First, at step S61, it is executed to judge whether a malfunction is detected in any one of the sensors etc. When the malfunction is detected, then the routine goes to step S63 to prohibit the output of duty. The background of prohibition is as follows. That is, in case of a malfunction in the sensor(s) or the like, there arises a possibility of controlling the tension of the webbing 11 in spite of no detection of either vehicle's braking or access to the front obstacle. In such a case, due to the possibility of risk on passengers, the output of duty is prohibited to avoid the occurrence of risk.

Similarly, if the prohibitive conditions are satisfied at step S62, then the routine goes to step S63 to prohibit the output of duty.

On the other hand, when no malfunction is detected and the above prohibitive conditions are not satisfied, then the routine goes to step S64 to permit the output of duty.

As shown in the flow chart of FIG. 7, according to this embodiment, when the braking flag is "1" (hard braking), there is established the operational mode of "1"; when the braking flag is "2" (soft braking), there is established the operational mode of "2"; and when the radar judgment flag is "1", there is established the operational mode of "3". Further, in the flow chart of FIG. 8, when the operational mode is "1", there is established the output duty of "D1"; when the operational mode is "2", there is established the output duty of "D2"; and when the operational mode is "3", there is established the output duty of "D3". Further, there is established a relationship of D2>D3. Therefore, a belt tension in case of the judgment of braking based on the manipulation of the brake pedal becomes larger than that of the radar judgment.

Figure 25:
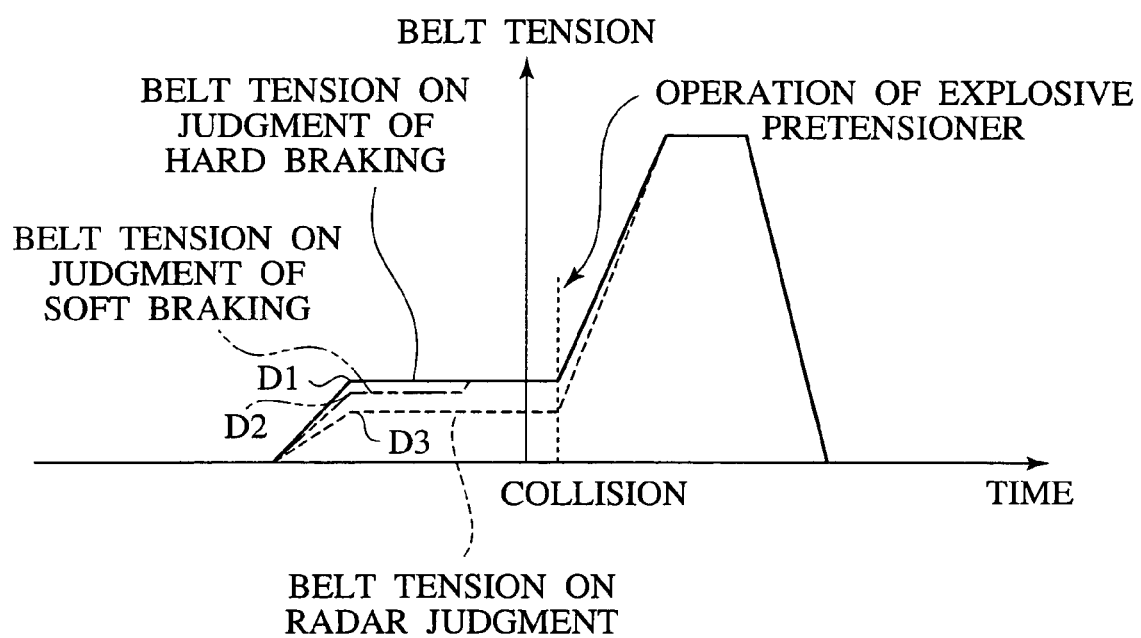
FIG. 25 is a characteristic view showing the change in belt tension based on the judgment of braking and the change in belt tension based on the radar judgment.

FIG. 25 is a characteristic view showing the changes in belt tension under the tension control on the judgment of braking (hard braking and soft braking) and that on the radar judgment.

From the figure, it will be understood that respective belt tensions are flattened until a vehicle collision; nevertheless the belt tension is the largest one under the control on the judgment of hard braking, the second largest tension under the control on the judgment of soft braking, and the belt tension is the smallest one under the control on the radar judgment.

The reason of establishing the belt tension in the above way resides in that the tension control on the judgment of braking (hard braking and soft braking) requires not only a belt tension to remove a slack in seatbelt but also a force to suppress a passenger's body in opposition to its forward movement due to an inertia force by braking. To the contrary, the tension control on the radar judgment only requires a belt tension to remove a slack in seatbelt since the vehicle is not braking.

In this way, according to the seatbelt control apparatus of this embodiment, when the judgment of braking (i.e. tension control based on data by the brake manipulation detecting unit) occurs owing to the brake-pedal stroke sensor 20, a predetermined tension is generated in the webbing 11 to remove a slack therefrom.

Further, if an obstacle is detected in front of the vehicle by the laser radar 51 and a distance between the obstacle and the vehicle becomes short, a predetermined tension is produced in the webbing 11 in accordance with the radar judgment (i.e. tension control based on the detection data of the obstacle detecting unit), similarly. Thus, it becomes possible to restrain a passenger to the seat certainly in the previous stage to the operation of the second pretensioner, whereby a passenger's sense of incompatibility can be reduced. That is, under the tension control based on detection data by the brake manipulation detecting unit, the control unit allows the first pretensioner to always operate when it is judged that the vehicle is braking in an emergency. Therefore, it becomes possible to restrain a passenger to the seat certainly, whereby a passenger's sense of incompatibility can be reduced.

Further, the control of the first pretensioner 16 by the radar judgment (tension control of the webbing 11) is established so as not to work only for a predetermined period after a driver's stepping off the brake pedal. That is, it is noted that such a situation that the driver firstly manipulates the brake pedal and subsequently steps off it corresponds to a condition where the degree of risk is reduced to some degree. Under such a situation, if the tension control of the webbing 11 is carried out on the radar judgment, there would be only increased the sense of incompatibility rather than an improvement in restrictive capability. Thus, according to the above-mentioned embodiment, it is possible to cancel the occurrence of such a problem. That is, since the control unit detects a driver's braking operation and further prohibits the tension control based on detection data by the obstacle detecting unit only for a predetermined period when the canceling of the driver's braking operation is detected, it is possible to reduce the passenger's sense of incompatibility.

In the above-mentioned embodiment, the judgment whether the predetermined period has passed since the driver's stepping off the brake pedal at steps S31 and S32 of FIG. 6 allows the prohibition/execution of the radar judgment to be determined. In the modification, by prohibiting the radar judgment only while the driver is stepping on the brake pedal, it is possible to reduce the passenger's sense of incompatibility. Alternatively, the radar judgment may be prohibited for a predetermined period since the driver's stepping on and off the brake pedal. Or again, by making use of the judgment of urgent braking, it is also possible to prohibit the radar judgment as long as the urgent braking is established. That is, when the driver's braking operation is detected, it is carried out to prohibit the tension control based on detection data by the obstacle detecting unit only for a predetermined period. As a result, it is possible to reduce the passenger's sense of incompatibility. Furthermore, since the tension control based on detection data by the obstacle detecting unit is prohibited while the brake pedal is being manipulated by a driver, it is also possible to reduce the passenger's sense of incompatibility.

Figure 10:
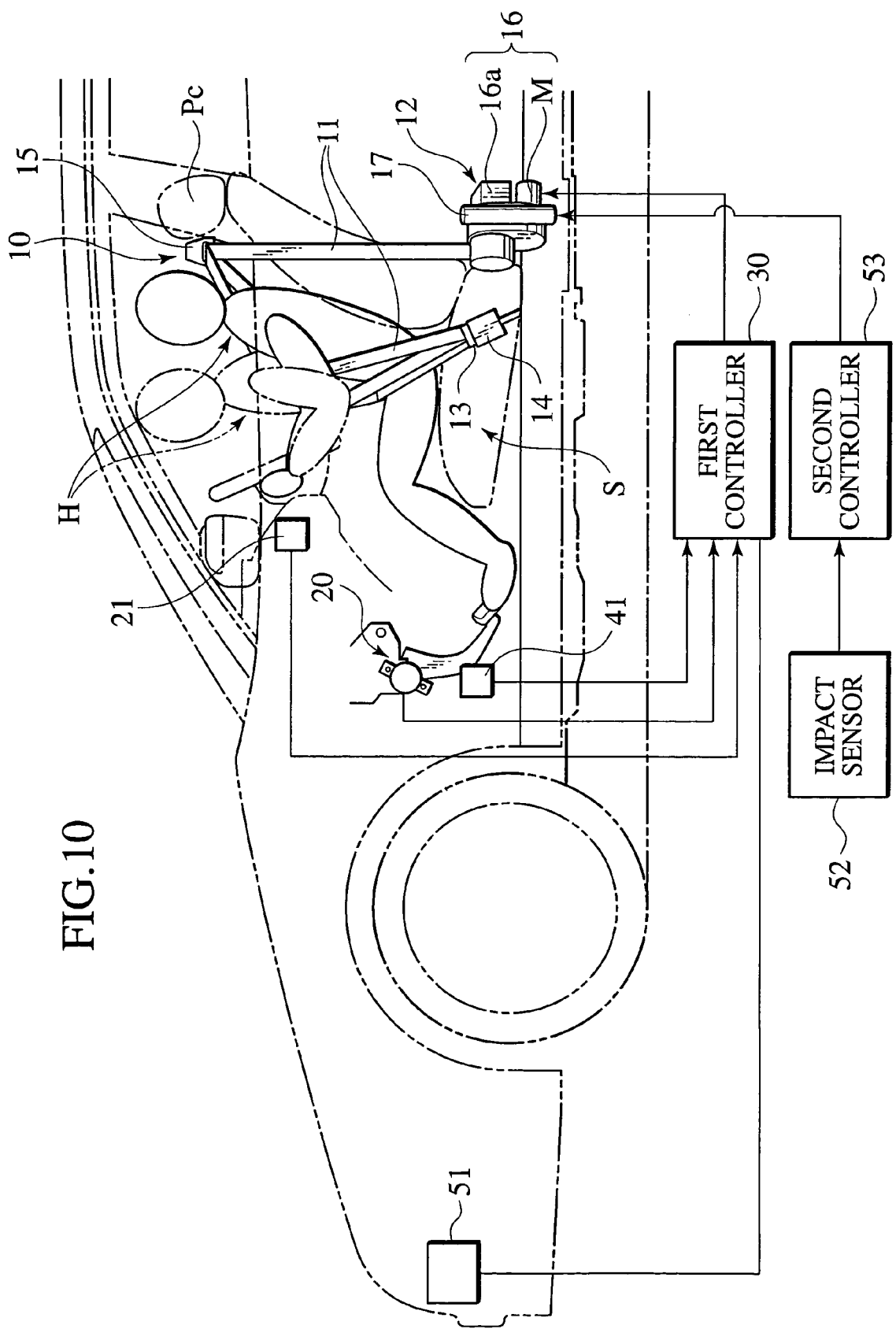
FIG. 10 is a view explaining the arrangement of constituents of a seatbelt control apparatus in accordance with the second embodiment of the present invention.
Figure 11:
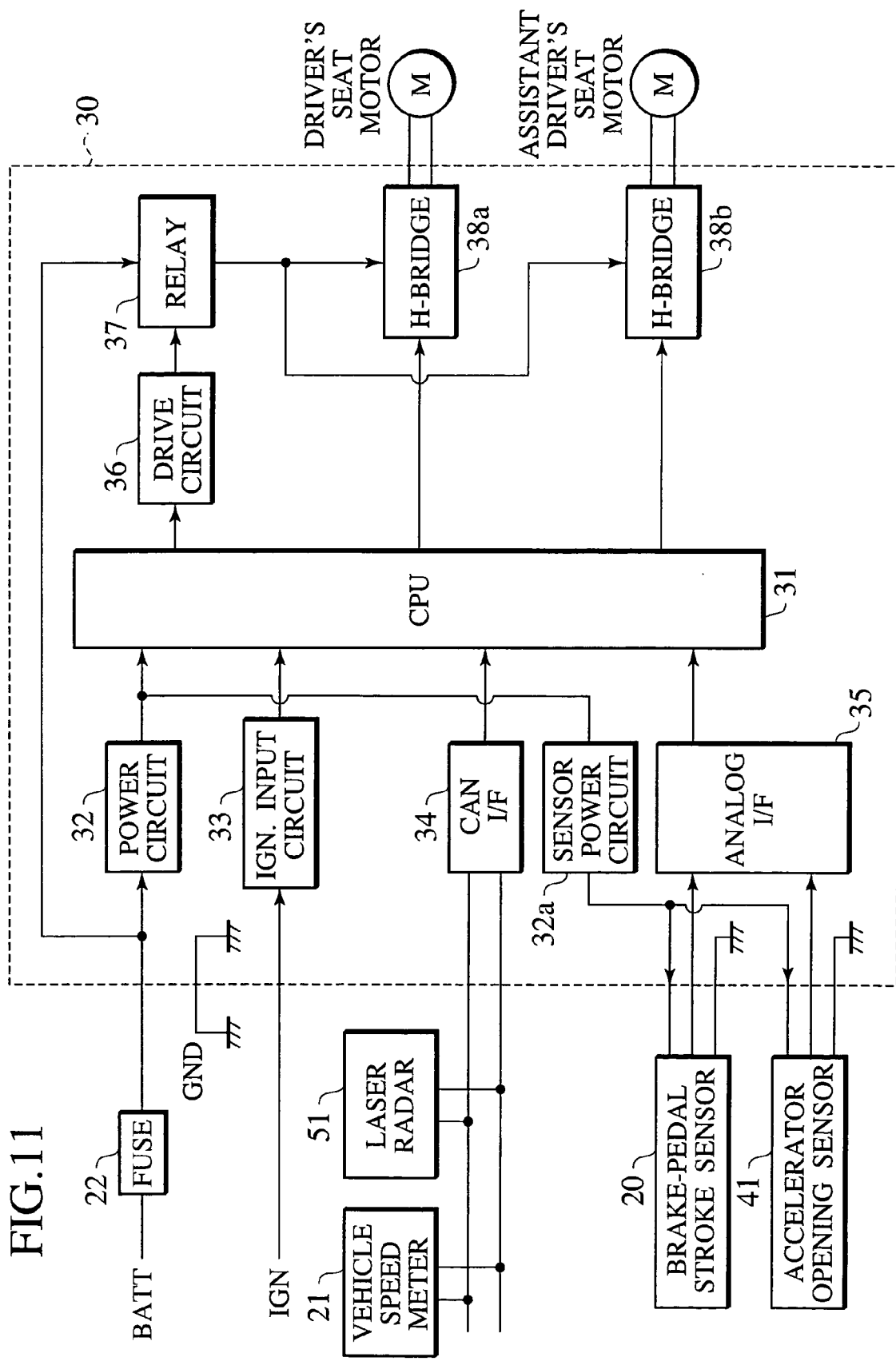
FIG. 11 is a block diagram showing the constitution of the seatbelt control apparatus in accordance with the second embodiment of the present invention.

Next, the second embodiment of the present invention will be described. FIG. 10 is a structural view of the seatbelt apparatus of the second embodiment of the invention. FIG. 11 is a block diagram showing the detailed constitution of the first controller 30.

As shown in FIG. 10, the seatbelt apparatus of the embodiment differs from that of FIG. 1 in the provision of an accelerator opening sensor 41 that generates an output signal to the first controller 30. That is, as shown in FIG. 11, the accelerator opening sensor 41 has its drive power supplied from the sensor power circuit 32a and generates a detection signal (accelerator opening signal) to the CPU 31 through the Analog•I/F 35. The other constituents of the embodiment are identical to those of FIGS. 1 and 2 and therefore, their descriptions are eliminated.

The seatbelt apparatus of the second embodiment operates as follows. The operation of the second embodiment only differs from that of the first embodiment, with respect to the radar judgment of FIG. 6. Therefore, the different radar judgment will be described below.

Figure 12:
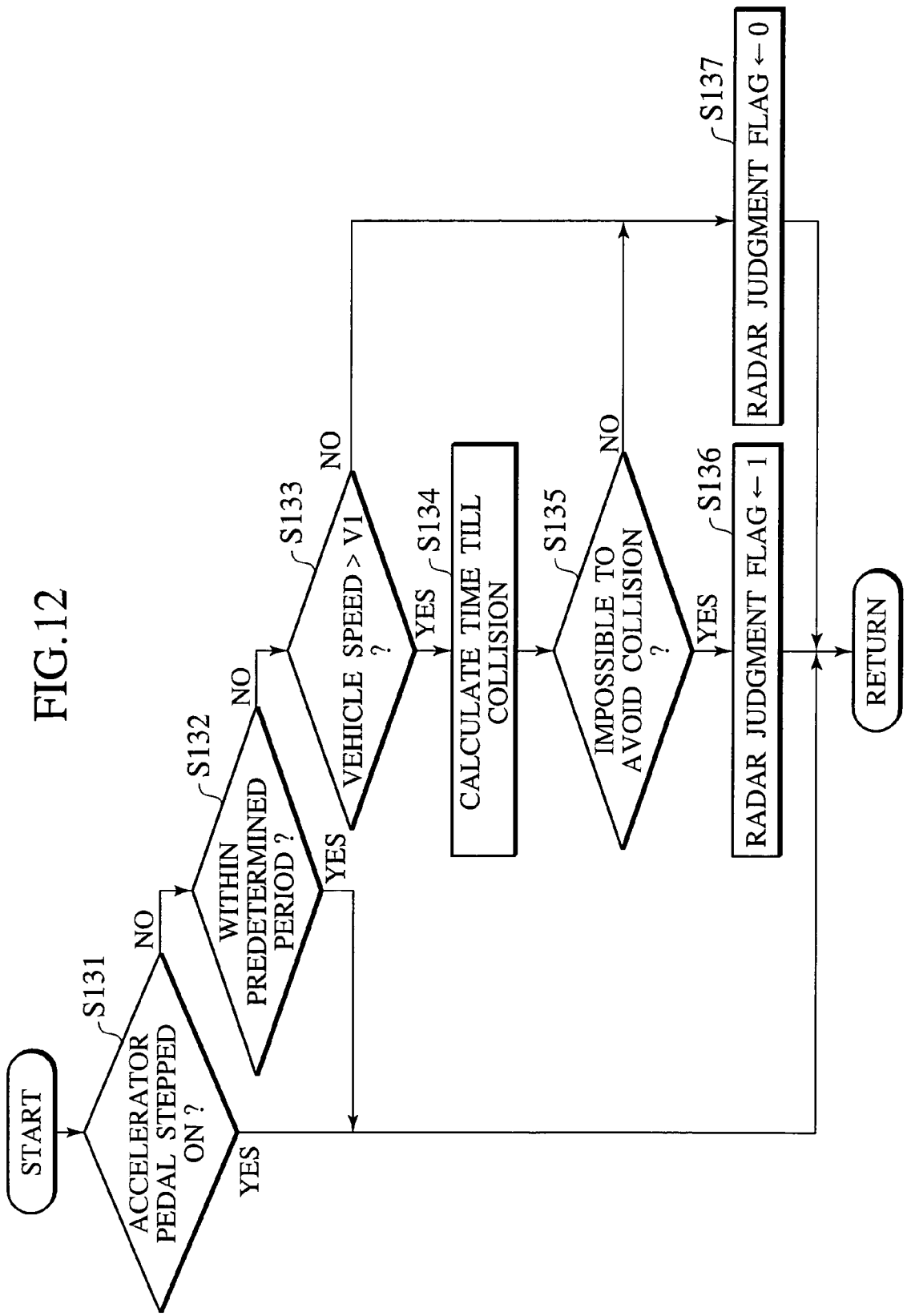
FIG. 12 is a flow chart showing the procedure of carrying out the radar judgment in accordance with the second embodiment of the invention.

FIG. 12 is a flow chart showing the detailed procedure of the above-mentioned radar judgment at step S6 of FIG. 3, also showing the radar judgment operation of the seatbelt apparatus of the second embodiment.

First of all, at step S131, it is executed to judge whether a driver is stepping on an accelerator pedal, based on the detection signal of the accelerator opening sensor 41. If the accelerator pedal is being stepped by the driver (judgment "Yes" at step S131), then the routine returns.

While, if the accelerator pedal is not stepped by the driver (Judgment "No" at step S131), then the routine goes to step S132 to judge whether a predetermined period has passed since the driver's stepping on the brake pedal was detected. If the predetermined period has not passed yet ("Yes" at step S132), the routine returns.

While, if the predetermined period has passed, in other words, when the judgment at step S132 is "No", the routine goes to step S133 to compare the present speed with the above speed V1. As a result, if the present speed is equal to or less than the speed V1, the judgment at step S133 becomes "No" and the routine goes to step S137 to set the radar judgment flag of "0".

When the present speed is more than the speed V1, the routine goes to step S134 to calculate a time until an abnormal access to the obstacle in front or time when the driver's vehicle is expected to have the collision. At step S135, based on the so-calculated time, it is executed to judge whether it is impossible for the driver's vehicle to avoid a collision or not. If the time enables the vehicle to avoid the collision, the judgment at step S135 becomes "No" and the routine goes to step S137 to set the radar judgment flag of "0". To the contrary, if it is impossible for the driver's vehicle to avoid the collision, the routine goes to step S136 to set the radar judgment flag of "1".

As for subsequent processes, as similar to the processing order shown in FIGS. 7 and 8, the operational mode is established on a basis of the situation whether the radar judgment is "0" or "1". Further, based on the so-established operational mode, the output duty is determined.

In this way, according to the seatbelt apparatus of the second embodiment of the invention, it is established so as not to activate the operational control of the first pretensioner 16 (i.e. tension control of the webbing 11) by the radar judgment during the detection of the driver's stepping on the accelerator pedal or unless the predetermined period has passed since the above detection. That is, it is generally noted that a driver usually steps on an accelerator pedal on the assumption that the driver has confirmed the presence of an obstacle in front. It can be judged that such a situation means a condition where the degree of risk is reduced to a certain extent. Accordingly, under such a circumference, if the tension control of the webbing 11 is carried out on the radar judgment, there would be only increased the sense of incompatibility rather than an improvement in restrictive capability against a passenger. Therefore, according to the second embodiment, it is possible to cancel the occurrence of such a problem. That is, when the accelerator pedal is manipulated by a driver, it is carried out to prohibit the tension control based on detection data by the obstacle detecting unit only for a predetermined period and therefore, it is possible to reduce the passenger's sense of incompatibility.

In other words, when the driver's manipulation together with a driver's will is detected, it is carried out to give a driver's judgment priority over the radar judgment, whereby the unnecessary operation of the first pretensioner 16 can be avoided.

Figure 13:
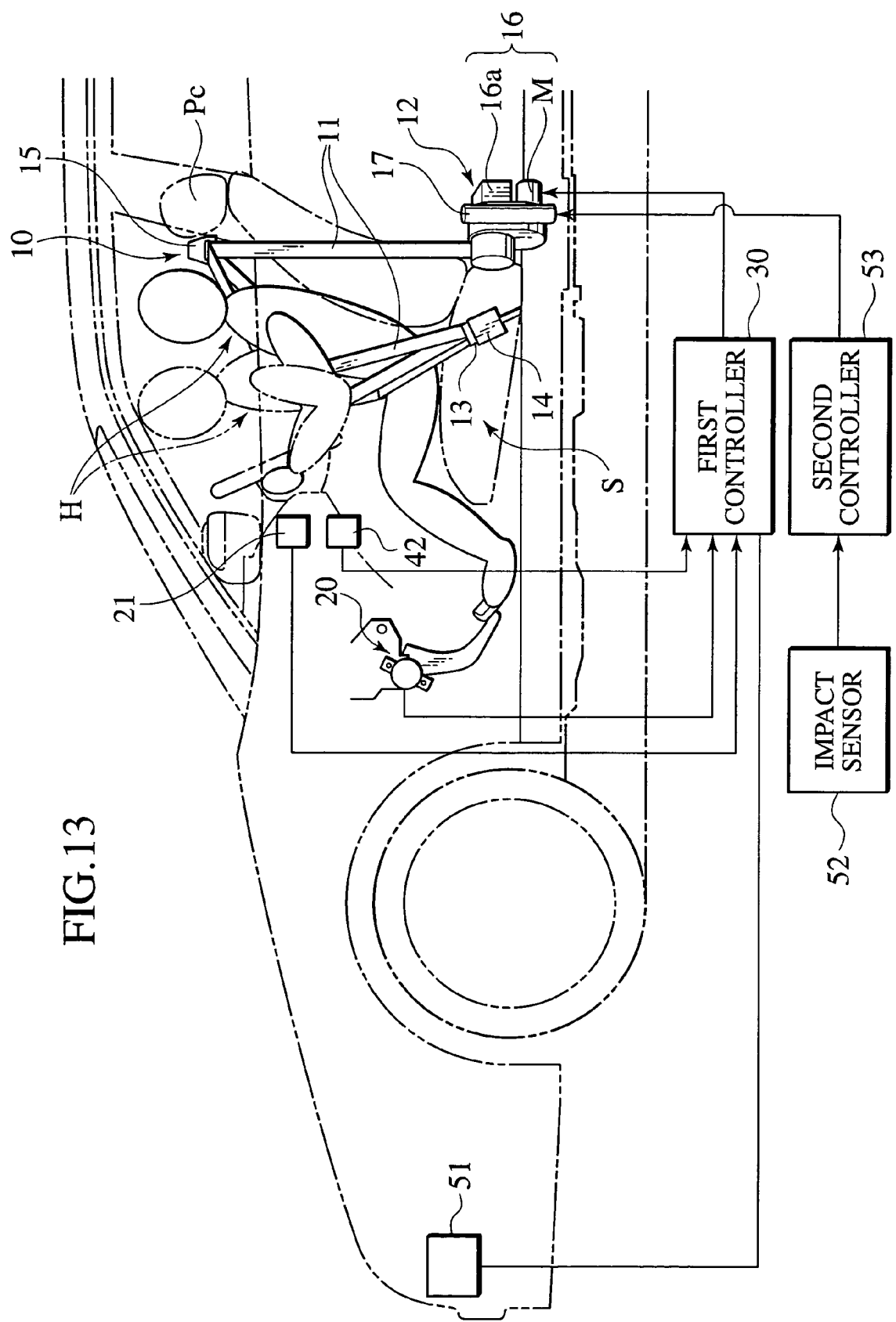
FIG. 13 is a view explaining the arrangement of constituents of a seatbelt control apparatus in accordance with the third embodiment of the present invention.
Figure 14:
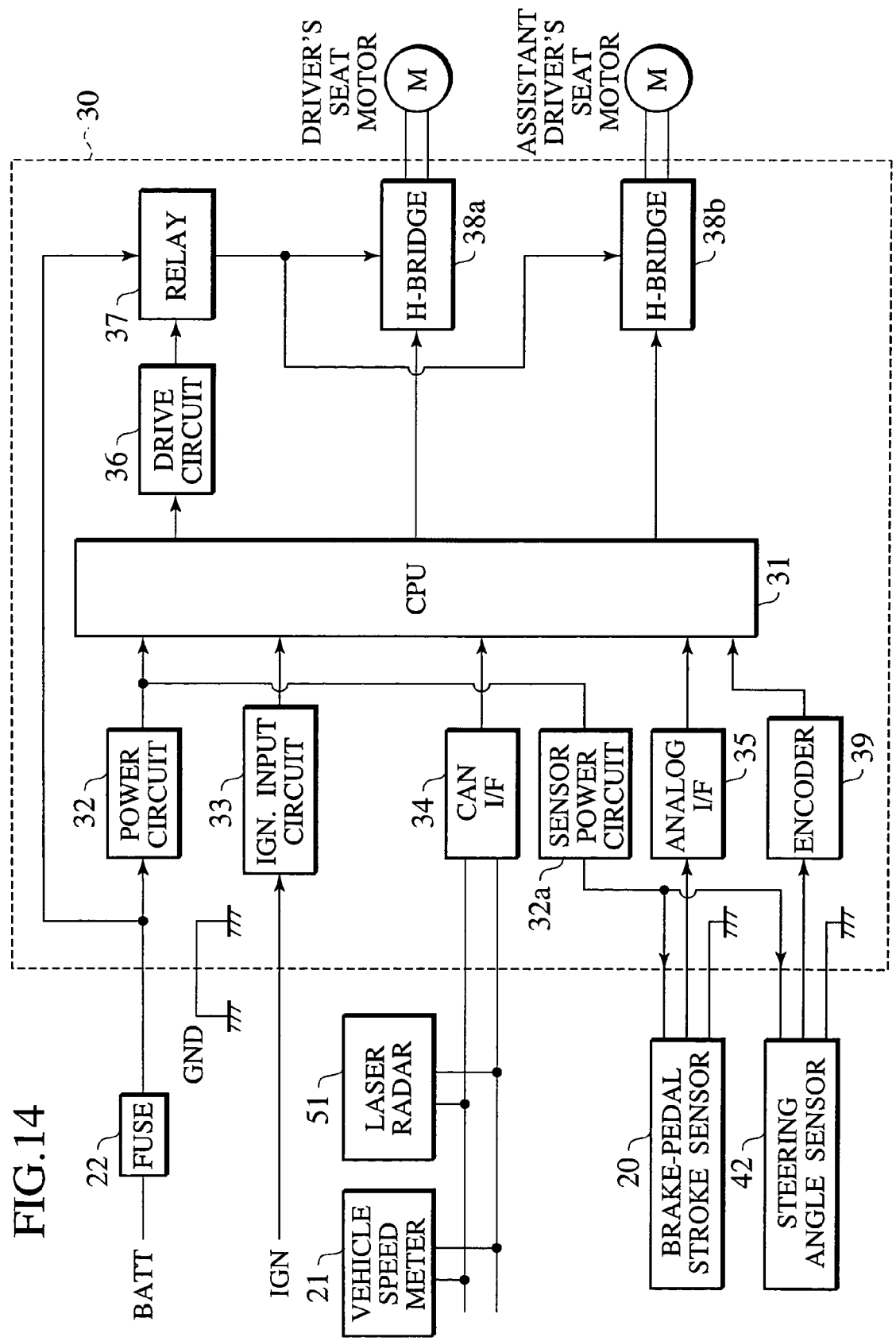
FIG. 14 is a block diagram showing the constitution of the seatbelt control apparatus in accordance with the third embodiment of the present invention.

Next, the third embodiment of the present invention will be described. FIG. 13 is a structural view of the seatbelt apparatus of the third embodiment of the invention. FIG. 14 is a block diagram showing the detailed constitution of the first controller 30.

As shown in FIG. 13, the seatbelt apparatus of the embodiment differs from that of FIG. 1 in the provision of a steering angle sensor 42 that generates an output signal to the first controller 30. That is, as shown in FIG. 14, the steering angle sensor 42 has its drive power supplied from the sensor power circuit 32a and generates a detection signal (steering angle signal) to the CPU 31 through an encoder 39. The other constituents of the embodiment are identical to those of FIGS. 1 and 2 and therefore, their descriptions are eliminated.

The seatbelt apparatus of the third embodiment operates as follows. The basic operation of this seatbelt apparatus is similar to that of the first embodiment. The operation of the third embodiment only differs from that of the first embodiment, with respect to the radar judgment of FIG. 6. Therefore, the different radar judgment will be described below.

Figure 15:
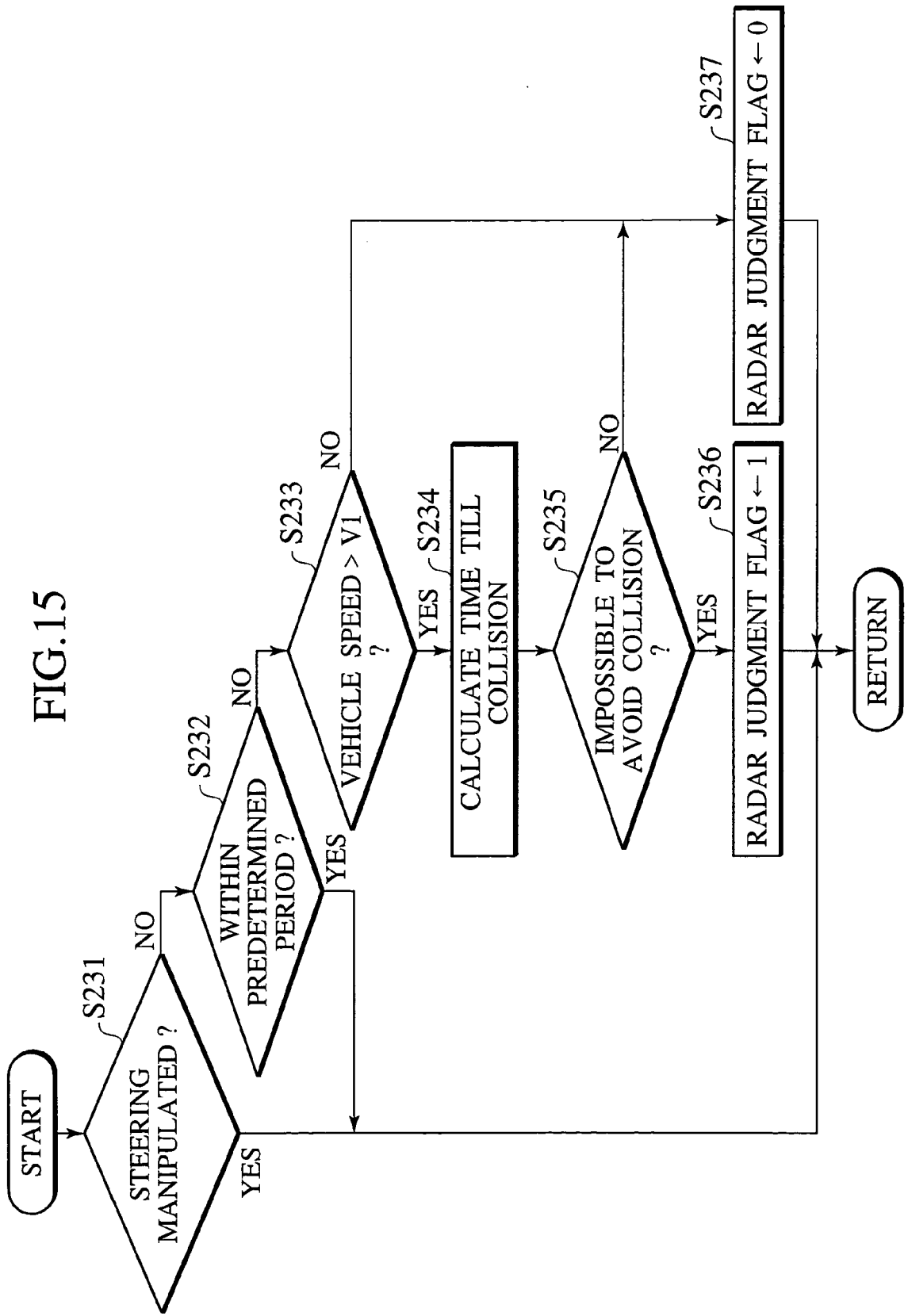
FIG. 15 is a flow chart showing the procedure of carrying out the radar judgment in accordance with the third embodiment of the invention.

FIG. 15 is a flow chart showing the detailed procedure of the above-mentioned radar judgment at step S6 of FIG. 3, also showing the radar judgment operation of the seatbelt apparatus of the third embodiment.

First of all, at step S231, it is executed to judge whether a steering wheel is being manipulated by a driver, based on the detection signal of the steering angle sensor 42. If the steering wheel is being manipulated by the driver judgment "Yes" at step S231), then the routine returns.

While, if the steering wheel is not being manipulated by the driver (judgment "No" at step S231), then the routine goes to step S232 to judge whether a predetermined period has passed since the driver's manipulation of the steering wheel was detected. If the predetermined period has not passed yet ("Yes" at step S232), the routine returns.

While, if the predetermined period has passed, in other words, when the judgment at step S232 is "No", the routine goes to step S233 to compare the present vehicle speed with the above speed V1. As a result, if the present vehicle speed is equal to or less than the speed V1, the judgment at step S233 becomes "No" and the routine goes to step S237 to set the radar judgment flag of "0".

When the present vehicle speed is more than the speed V1, the routine goes to step S234 to calculate a time until an abnormal access to the obstacle in front or time when the driver's vehicle is expected to have the collision. At step S235, based on the so-calculated time, it is executed to judge whether it is impossible for the driver's vehicle to avoid a collision or not. If the time enables the vehicle to avoid a collision, the judgment at step S235 becomes "No" and the routine goes to step S237 to set the radar judgment flag of "0". To the contrary, if it is impossible for the driver's vehicle to avoid the collision, the routine goes to step S236 to set the radar judgment flag of "1".

As for subsequent processes, as similar to the processing order shown in FIGS. 7 and 8, the operational mode is established on a basis of the situation whether the radar judgment is "0" or "1". Further, based on the so-established operational mode, the output duty is determined.

In this way, according to the seatbelt apparatus of the third embodiment of the invention, it is established so as not to activate the operational control of the first pretensioner 16 (i.e. tension control of the webbing 11) by the radar judgment during the detection of the driver's manipulation of the steering wheel or unless the predetermined period has passed since the above detection. That is, it should be noted that the driver's manipulation of the steering wheel is based on the premise that the driver is keeping observation on the front of a driver's vehicle. Thus, it can be judged that such a situation means a condition where the degree of risk is reduced to a certain extent. Accordingly, under such a circumference, if the tension control of the webbing 11 is carried out on the radar judgment, there would be only increased the sense of incompatibility rather than an improvement in restrictive capability against a passenger. Therefore, according to the third embodiment, it is possible to cancel the occurrence of such a problem. That is, when the steering wheel is manipulated by a driver, it is carried out to prohibit the tension control based on detection data by the obstacle detecting unit only for a predetermined period and therefore, it is possible to reduce the passenger's sense of incompatibility.

Figure 16:
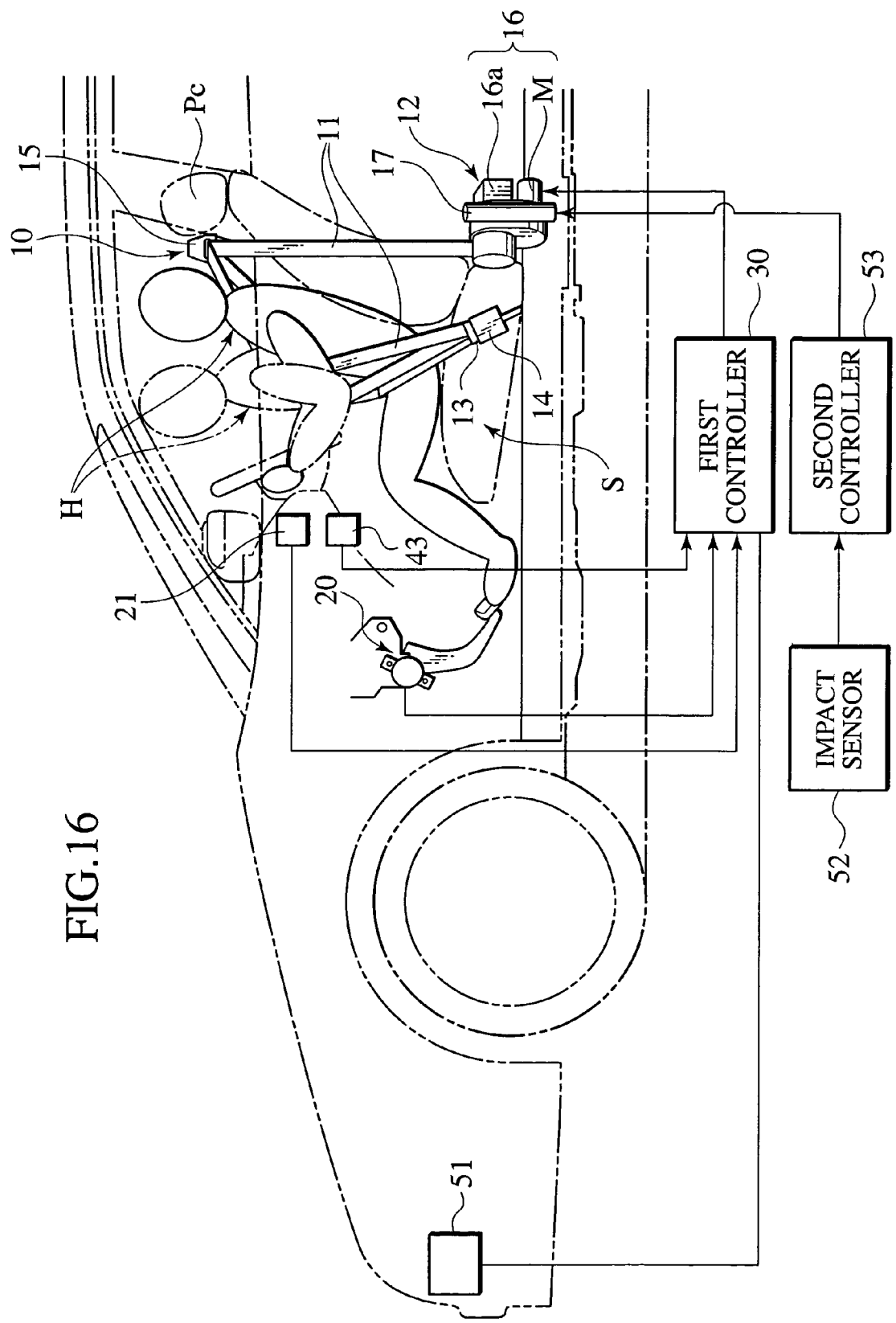
FIG. 16 is a view explaining the arrangement of constituents of a seatbelt control apparatus in accordance with the fourth embodiment of the present invention.
Figure 17:
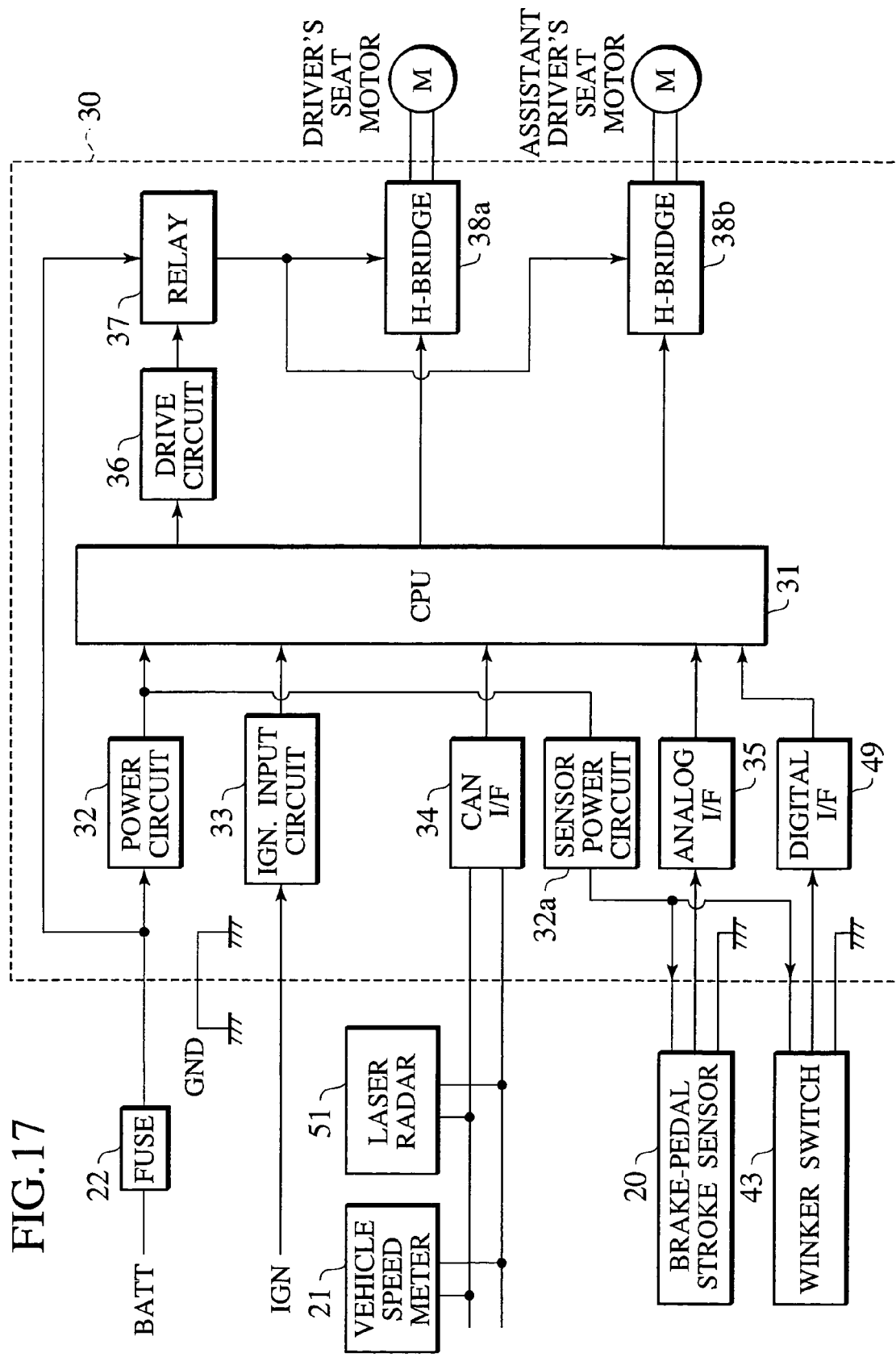
FIG. 17 is a block diagram showing the constitution of the seatbelt control apparatus in accordance with the fourth embodiment of the present invention.

Next, the fourth embodiment of the present invention will be described. FIG. 16 is a structural view of the seatbelt apparatus of the fourth embodiment of the invention. FIG. 17 is a block diagram showing the detailed constitution of the first controller 30.

As shown in FIG. 16, the seatbelt apparatus of the embodiment differs from that of FIG. 1 in the provision of a winker switch 43 that generates an output signal to the first controller 30. That is, as shown in FIG. 17, the winker switch 43 has its drive power supplied from the sensor power circuit 32a and generates a detection signal (winker signal) to the CPU 31 through a Digital I/F 49. The other constituents of the embodiment are identical to those of FIGS. 1 and 2 and therefore, their descriptions are eliminated.

The seatbelt apparatus of the fourth embodiment operates as follows. The basic operation of this seatbelt apparatus is similar to that of the first embodiment. The operation of the fourth embodiment only differs from that of the first embodiment, with respect to the radar judgment of FIG. 6. Therefore, the different radar judgment will be described below.

Figure 18:
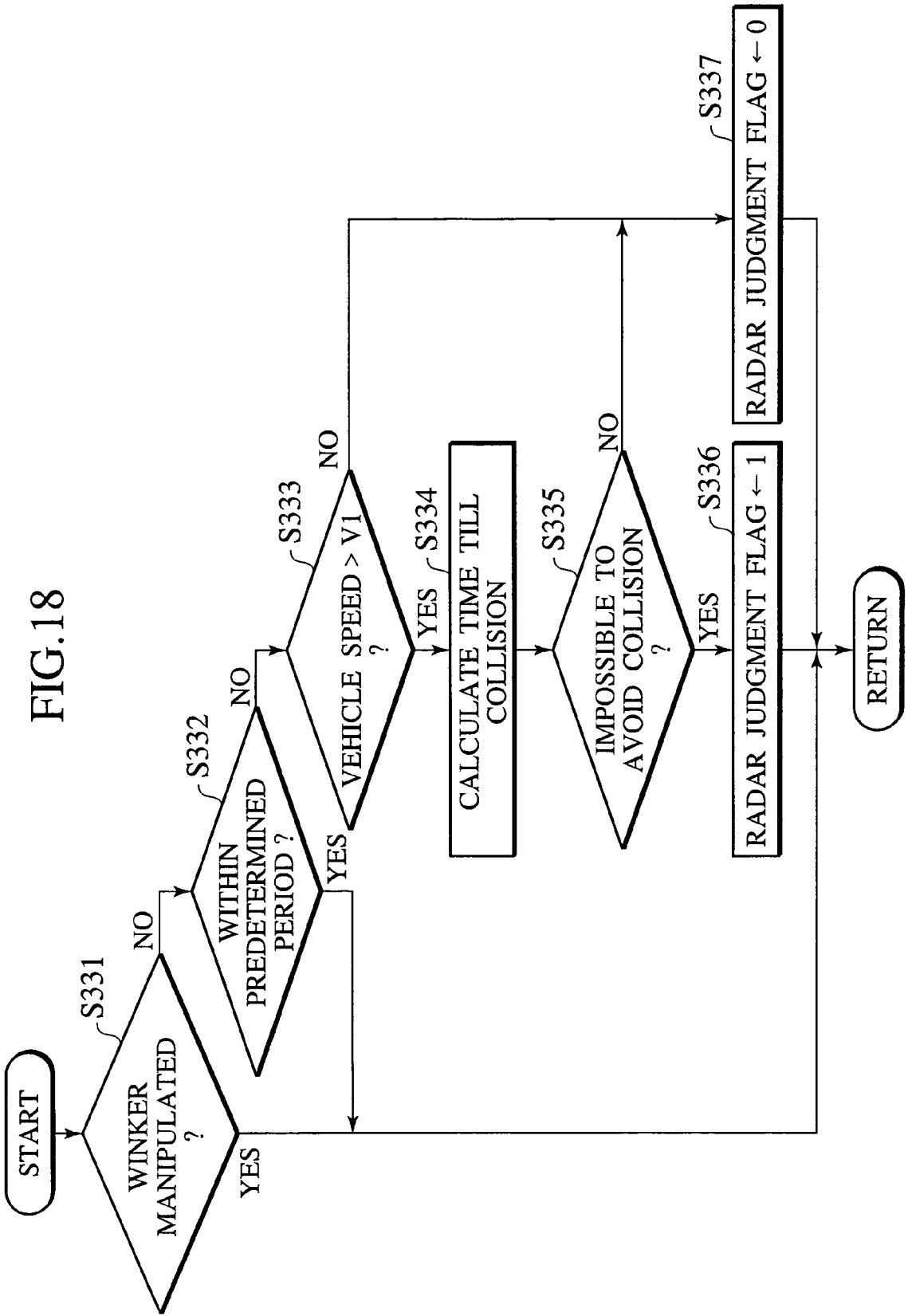
FIG. 18 is a flow chart showing the procedure of carrying out the radar judgment in accordance with the fourth embodiment of the invention.

FIG. 18 is a flow chart showing the detailed procedure of the above-mentioned radar judgment at step S6 of FIG. 3, also showing the radar judgment operation of the seatbelt apparatus of the fourth embodiment.

First of all, at step S331, it is executed to judge whether a winker is being manipulated by a driver, based on the detection signal of the winker switch 43. If the winker is being manipulated by the driver (judgment "Yes" at step S331), then the routine returns.

While, if the winker is not being manipulated by the driver (judgment "No" at step S331), then the routine goes to step S332 to judge whether a predetermined period has passed since the driver's manipulation of the winker was detected. If the predetermined period has not passed yet ("Yes" at step S332), the routine returns.

While, if the predetermined period has passed, in other words, when the judgment at step S332 is "No", the routine goes to step S333 to compare the present vehicle speed with the above speed V1. As a result, if the present vehicle speed is equal to or less than the speed V1, the judgment at step S333 becomes "No" and the routine goes to step S337 to set the radar judgment flag of "0".

When the present vehicle speed is more than the speed V1, the routine goes to step S334 to calculate a time until an abnormal access to the obstacle in front or time when the driver's vehicle is expected to have the collision. At step S335, based on the so-calculated time, it is executed to judge whether it is impossible for the driver's vehicle to avoid a collision or not. If the time enables the vehicle to avoid the collision, the judgment at step S335 becomes "No" and the routine goes to step S337 to set the radar judgment flag of "0". To the contrary, if it is impossible for the driver's vehicle to avoid the collision, the routine goes to step S336 to set the radar judgment flag of "1".

As for subsequent processes, as similar to the processing order shown in FIGS. 7 and 8, the operational mode is established on a basis of the situation whether the radar judgment is "0" or "1". Further, based on the so-established operational mode, the output duty is determined.

In this way, according to the seatbelt apparatus of the fourth embodiment of the invention, it is established so as not to activate the operational control of the first pretensioner 16 (i.e. tension control of the webbing 11) by the radar judgment during the detection of the driver's manipulation of the winker or unless the predetermined period has passed since the above detection. That is, it should be noted that the driver's manipulation of the winker is based on the premise that the driver is keeping observation on the front of a driver's vehicle. Thus, it can be judged that such a situation means a condition where the degree of risk is reduced to a certain extent. Accordingly, under such a circumference, if the tension control of the webbing 11 is carried out on the radar judgment, there would be only increased the sense of incompatibility rather than an improvement in restrictive capability against a passenger. Therefore, according to the fourth embodiment, it is possible to cancel the occurrence of such a problem. That is, when the winker is manipulated by a driver, it is carried out to prohibit the tension control based on detection data by the obstacle detecting unit only for a predetermined period and therefore, it is possible to reduce the passenger's sense of incompatibility.

Figure 19:
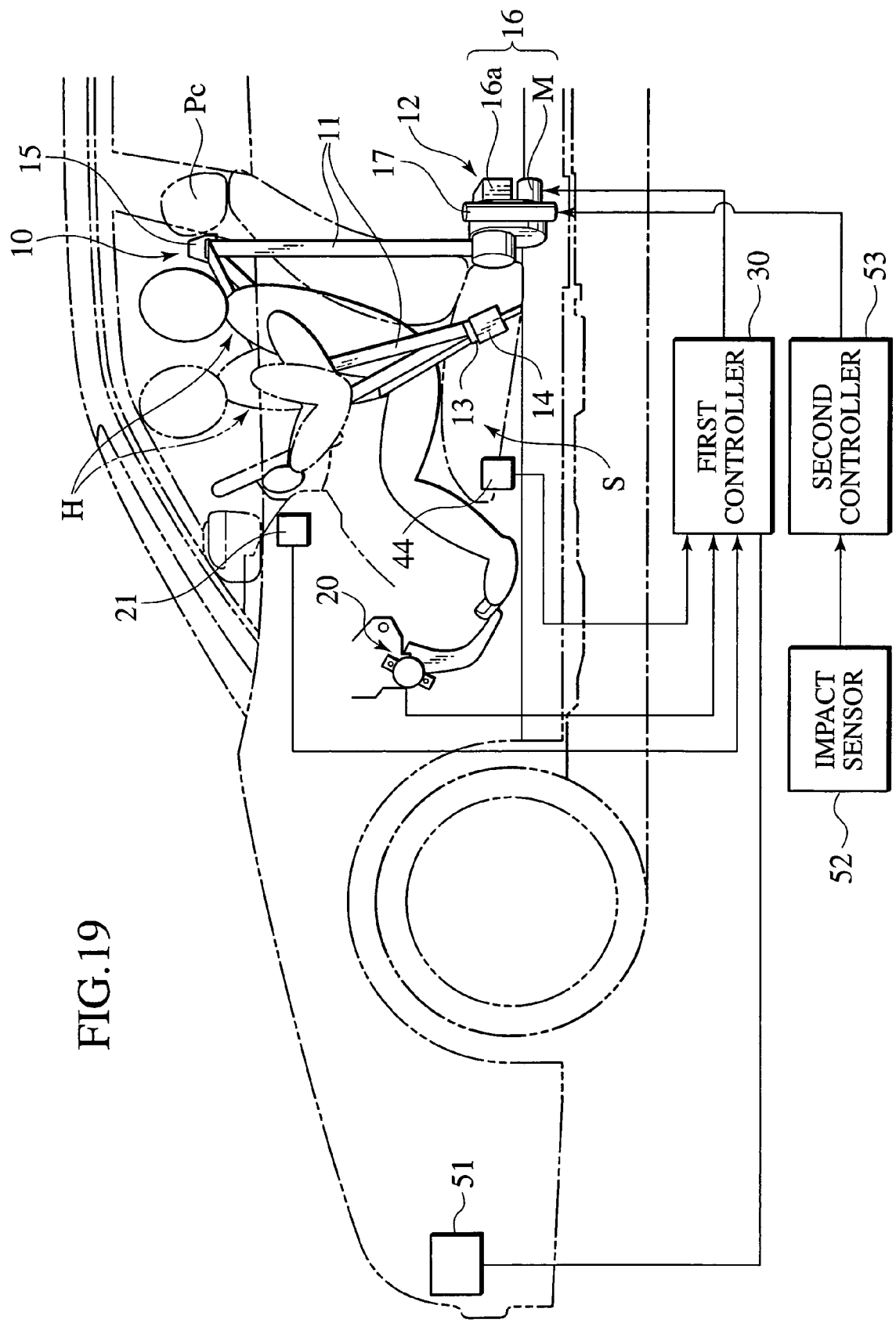
FIG. 19 is a view explaining the arrangement of constituents of a seatbelt control apparatus in accordance with the fifth embodiment of the present invention.
Figure 20:
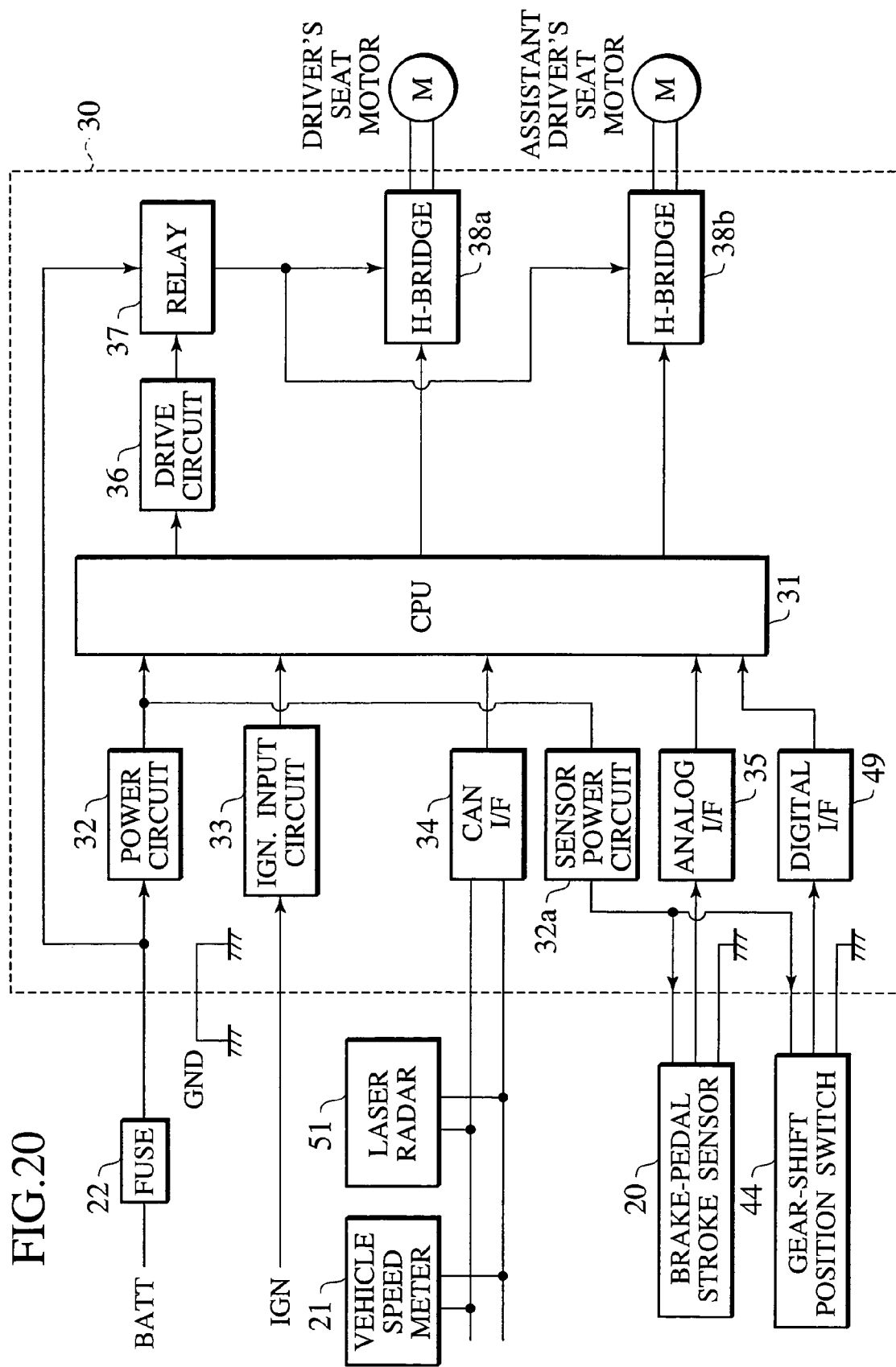
FIG. 20 is a block diagram showing the constitution of the seatbelt control apparatus in accordance with the fifth embodiment of the present invention.

Next, the fifth embodiment of the present invention will be described. FIG. 19 is a structural view of the seatbelt apparatus of the fourth embodiment of the invention. FIG. 20 is a block diagram showing the detailed constitution of the first controller 30.

As shown in FIG. 19, the seatbelt apparatus of the embodiment differs from that of FIG. 1 in the provision of a gear-shift position switch 44 that generates an output signal to the first controller 30. That is, as shown in FIG. 20, the gear-shift position switch 44 has its drive power supplied from the sensor power circuit 32a and generates a detection signal (winker signal) to the CPU 31 through the Digital I/F 49. The other constituents of the embodiment are identical to those of FIGS. 1 and 2 and therefore, their descriptions are eliminated.

The seatbelt apparatus of the fifth embodiment operates as follows. The basic operation of this seatbelt apparatus is similar to that of the first embodiment. The operation of the fifth embodiment only differs from that of the first embodiment, with respect to the radar judgment of FIG. 6. Therefore, the different radar judgment will be described below.

Figure 21:
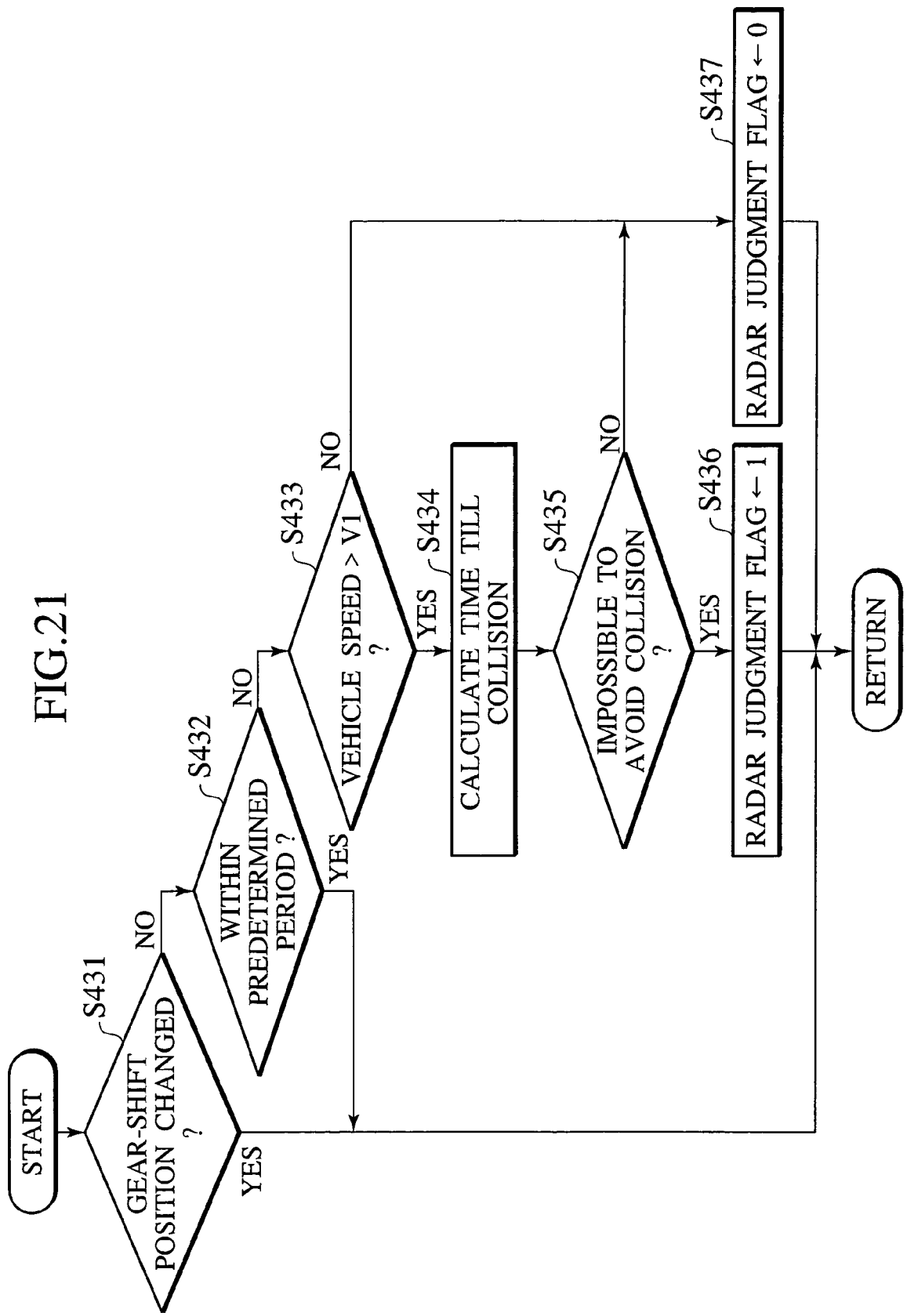
FIG. 21 is a flow chart showing the procedure of carrying out the radar judgment in accordance with the fifth embodiment of the invention.

FIG. 21 is a flow chart showing the detailed procedure of the above-mentioned radar judgment at step S6 of FIG. 3, also showing the radar judgment operation of the seatbelt apparatus of the fifth embodiment.

First of all, at step S431, it is executed to judge whether a gear-shift lever is being manipulated by a driver, based on the detection signal of the gear-shift position switch 44. If the gear-shift lever is being manipulated by the driver (judgment "Yes" at step S431), then the routine returns.

While, if the winker is not being manipulated by the driver judgment "No" at step S431), then the routine goes to step S432 to judge whether a predetermined period has passed since the driver's manipulation of the gear-shift lever was detected. If the predetermined period has not passed yet ("Yes" at step S432), the routine returns.

While, if the predetermined period has passed, in other words, when the judgment at step S432 is "No", the routine goes to step S433 to compare the present vehicle speed with the above speed V1. As a result, if the present vehicle speed is equal to or less than the speed V1, the judgment at step S433 becomes "No" and the routine goes to step S437 to set the radar judgment flag of "0".

When the present vehicle speed is more than the speed V1, the routine goes to step S434 to calculate a time until an abnormal access to the obstacle in front or time when the driver's vehicle is expected to have the collision. At step S335, based on the so-calculated time, it is executed to judge whether it is impossible for the driver's vehicle to avoid a collision or not. If the time enables the vehicle to avoid the collision, the judgment at step S435 becomes "No" and the routine goes to step S437 to set the radar judgment flag of "0". To the contrary, if it is impossible for the driver's vehicle to avoid the collision, the routine goes to step S436 to set the radar judgment flag of "1".

As for subsequent processes, as similar to the processing order shown in FIGS. 7 and 8, the operational mode is established on a basis of the situation whether the radar judgment is "0" or "1". Further, based on the so-established operational mode, the output duty is determined.

In this way, according to the seatbelt apparatus of the fifth embodiment of the invention, it is established so as not to activate the operational control of the first pretensioner 16 (i.e. tension control of the webbing 11) by the radar judgment during the detection of the driver's manipulation of the gear-shift lever or unless the predetermined period has passed since the above detection. That is, it should be noted that the driver's manipulation of the winker is based on the premise that the driver is keeping observation on the front of a driver's vehicle. Thus, it can be judged that such a situation means a condition where the degree of risk is reduced to a certain extent. Accordingly, under such a circumference, if the tension control of the webbing 11 is carried out on the radar judgment, there would be only increased the sense of incompatibility rather than an improvement in restrictive capability against a passenger. Therefore, according to the fifth embodiment, it is possible to cancel the occurrence of such a problem. That is, when the gear-shift lever is manipulated by a driver, it is carried out to prohibit the tension control based on detection data by the obstacle detecting unit only for a predetermined period and therefore, it is possible to reduce the passenger's sense of incompatibility.

Figure 22:
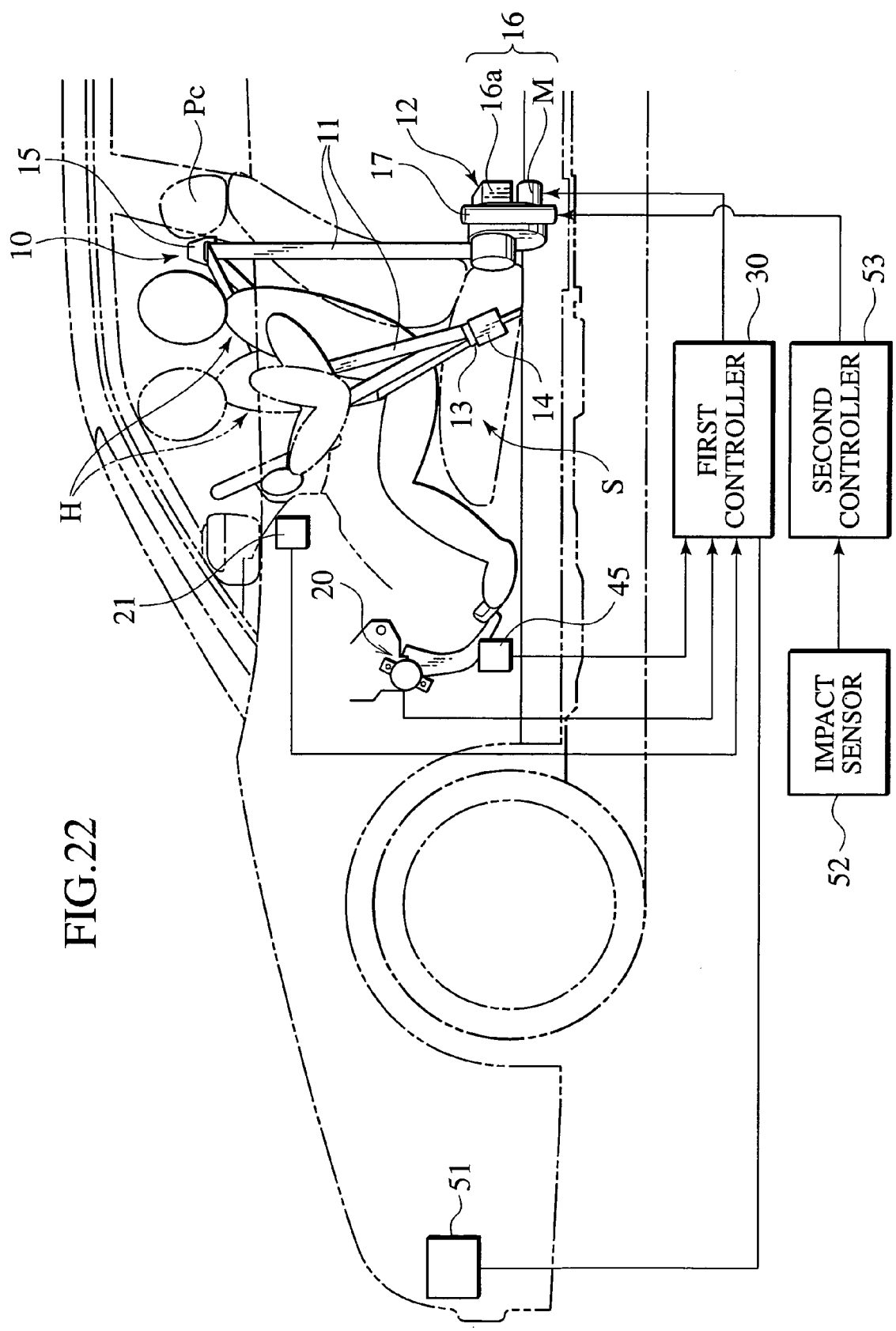
FIG. 22 is a view explaining the arrangement of constituents of a seatbelt control apparatus in accordance with the sixth embodiment of the present invention.
Figure 23:
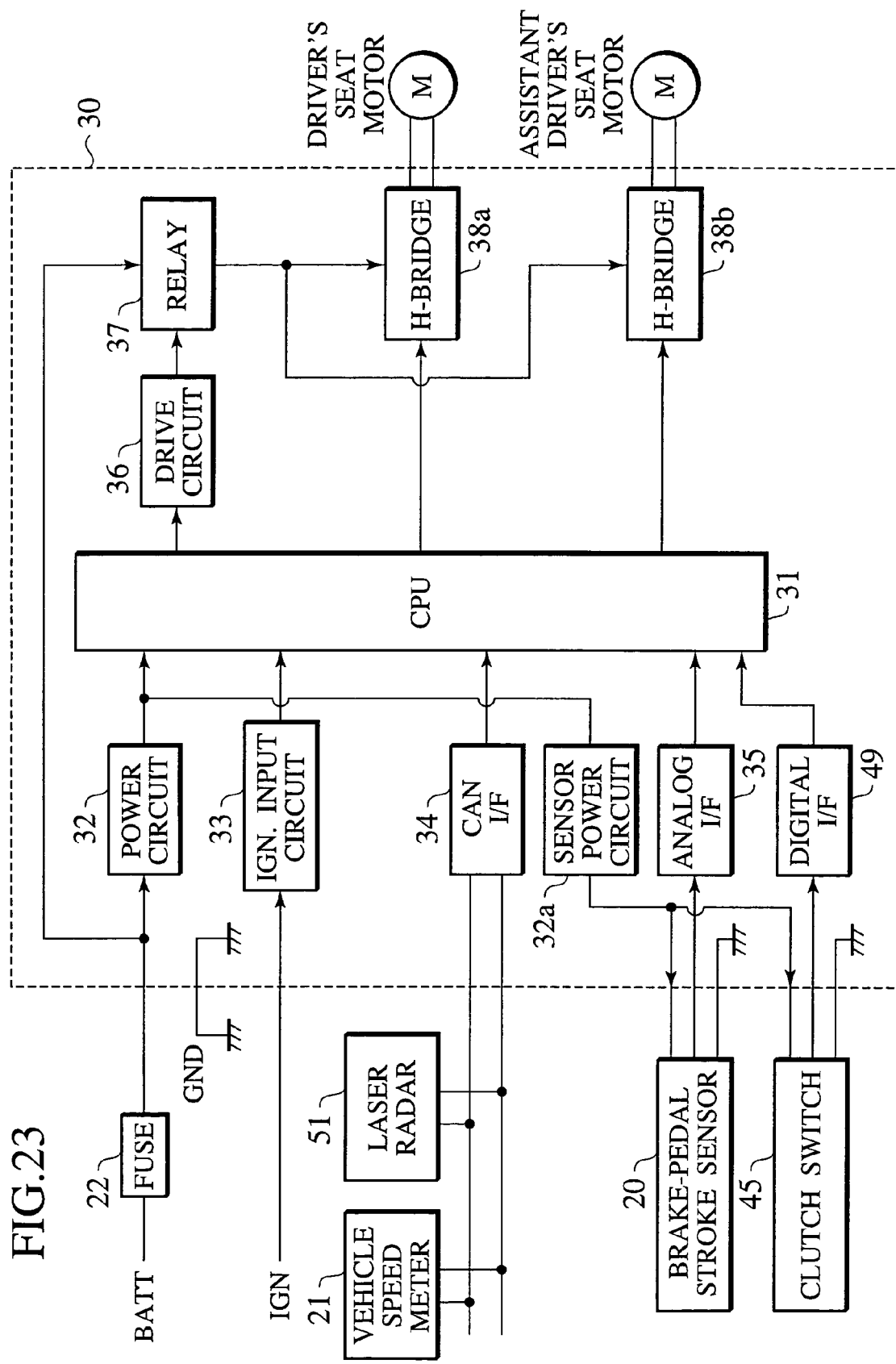
FIG. 23 is a block diagram showing the constitution of the seatbelt control apparatus in accordance with the sixth embodiment of the present invention.

Next, the sixth embodiment of the present invention will be described. FIG. 22 is a structural view of the seatbelt apparatus of the sixth embodiment of the invention. FIG. 23 is a block diagram showing the detailed constitution of the first controller 30.

As shown in FIG. 22, the seatbelt apparatus of the embodiment differs from that of FIG. 1 in the provision of a clutch switch 45 that generates an output signal to the first controller 30. That is, as shown in FIG. 23, the clutch switch 45 has its drive power supplied from the sensor power circuit 32a and generates a detection signal (winker signal) to the CPU 31 through the Digital I/F 49. The other constituents of the embodiment are identical to those of FIGS. 1 and 2 and therefore, their descriptions are eliminated.

The seatbelt apparatus of the sixth embodiment operates as follows. The basic operation of this seatbelt apparatus is similar to that of the first embodiment. The operation of the fifth embodiment only differs from that of the first embodiment, with respect to the radar judgment of FIG. 6. Therefore, the different radar judgment will be described below.

Figure 24:
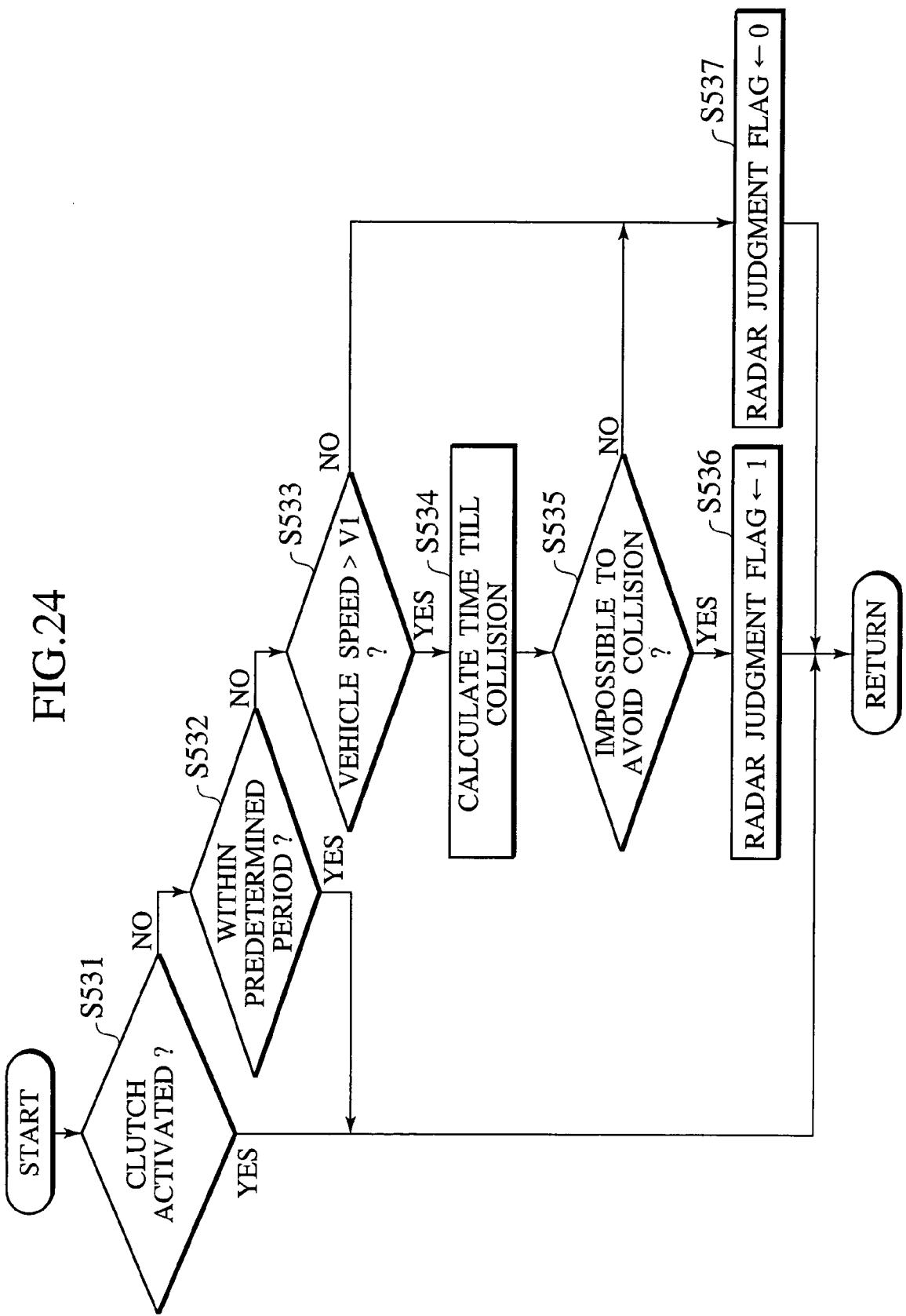
FIG. 24 is a flow chart showing the procedure of carrying out the radar judgment in accordance with the sixth embodiment of the invention.

FIG. 24 is a flow chart showing the detailed procedure of the above-mentioned radar judgment at step S6 of FIG. 3, also showing the radar judgment operation of the seatbelt apparatus of the sixth embodiment.

First of all, at step S531, it is executed to judge whether a clutch is being activated by a driver, based on the detection signal of the clutch switch 45. If the clutch is being activated by the driver (judgment "Yes" at step S531), then the routine returns.

While, if the clutch is not being activated by the driver (judgment "No" at step S531), then the routine goes to step S532 to judge whether a predetermined period has passed since the activation of the clutch was detected. If the predetermined period has not passed yet ("Yes" at step S532), the routine returns.

While, if the predetermined period has passed, in other words, when the judgment at step S532 is "No", the routine goes to step S533 to compare the present vehicle speed with the above speed V1. As a result, if the present vehicle speed is equal to or less than the speed V1, the judgment at step S533 becomes "No" and the routine goes to step S537 to set the radar judgment flag of "0".

When the present vehicle speed is more than the speed V1, the routine goes to step S534 to calculate a time until an abnormal access to the obstacle in front or time when the driver's vehicle is expected to have the collision. At step S535, based on the so-calculated time, it is executed to judge whether it is impossible for the driver's vehicle to avoid a collision or not. If the time enables the vehicle to avoid the collision, the judgment at step S535 becomes "No" and the routine goes to step S537 to set the radar judgment flag of "0". To the contrary, if it is impossible for the driver's vehicle to avoid the collision, the routine goes to step S536 to set the radar judgment flag of "1".

As for subsequent processes, as similar to the processing order shown in FIGS. 7 and 8, the operational mode is established on a basis of the situation whether the radar judgment is "0" or "1". Further, based on the so-established operational mode, the output duty is determined.

In this way, according to the seatbelt apparatus of the sixth embodiment of the invention, it is established so as not to activate the operational control of the first pretensioner 16 (i.e. tension control of the webbing 11) by the radar judgment during the detection of the activation of the clutch or unless the predetermined period has passed since the above detection. That is, it should be noted that the driver's turning the clutch on is based on the premise that the driver is keeping observation on the front of a driver's vehicle. Thus, it can be judged that such a situation means a condition where the degree of risk is reduced to a certain extent. Accordingly, under such a circumference, if the tension control of the webbing 11 is carried out on the radar judgment, there would be only increased the sense of incompatibility rather than an improvement in restrictive capability against a passenger. Therefore, according to the sixth embodiment, it is possible to cancel the occurrence of such a problem. That is, when the clutch is manipulated by a driver, it is carried out to prohibit the tension control based on detection data by the obstacle detecting unit only for a predetermined period and therefore, it is possible to reduce the passenger's sense of incompatibility.

Japanese Patent Application No. 2002-318113 filed on Jun. 26, 2003, is incorporated herein by reference in its entirety.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the invention as set forth in the appended claims.

What is claimed is:

1. A seatbelt apparatus for a vehicle, comprising:
a webbing for restraining a passenger seated on a seat;
a retractor for winding and rewinding the webbing;
a first pretensioner for winding the webbing to the retractor by a first tension;
a second pretensioner for applying a second tension to the webbing in an emergency about the vehicle to restrain the passenger;
a manipulated brake detecting unit for detecting a manipulated amount of a brake pedal of the vehicle;
an obstacle detecting unit for detecting an obstacle in front of the vehicle; and
a control unit for controlling the first tension by the first pretensioner in accordance with at least one of a tension control based on detection data by the manipulated brake detecting unit and another tension control based on detection data by the obstacle detecting unit,
wherein the control unit, under the tension control based on detection data by the manipulated brake detecting unit, allows the first pretensioner to always operate when it is judged that the vehicle is braking in an emergency,
the control unit, under the tension control based on detection data by the obstacle detecting unit, allows the first pretensioner to operate selectively, and the control unit is adapted to detect an operation of the passenger and prohibit the tension control based on detection data by the obstacle detecting unit for a predetermined time period.

2. The seatbelt apparatus for the vehicle of claim 1, wherein the control unit is adapted to prohibit the tension control based on detection data by the obstacle detecting unit for a predetermined period when a driver's driving manipulation is detected.

3. The seatbelt apparatus for the vehicle of claim 1, wherein the control unit is adapted to detect a driver's braking operation and prohibit the tension control based on detection data by the obstacle detecting unit for a predetermined period when the driver's braking operation is detected.

4. The seatbelt apparatus for the vehicle of claim 1, wherein the control unit is adapted to detect a driver's braking operation and prohibit the tension control based on detection data by the obstacle detecting unit for a predetermined period when a canceling of the driver's braking operation is detected.

5. The seatbelt apparatus for the vehicle of claim 1, wherein the control unit is adapted to detect a driver's braking operation and prohibit the tension control based on detection data by the obstacle detecting unit while a brake pedal is being manipulated by the driver.

6. The seatbelt apparatus for the vehicle of claim 1, wherein the control unit is adapted to detect a driver's accelerating operation and prohibit the tension control based on detection data by the obstacle detecting unit for a predetermined period when an accelerator pedal is manipulated by the driver.

7. The seatbelt apparatus for the vehicle of claim 1, wherein the control unit is adapted to detect a driver's manipulating of a steering wheel and prohibit the tension control based on detection data by the obstacle detecting unit for a predetermined period when the steering wheel is manipulated by the driver.

8. The seatbelt apparatus for the vehicle of claim 1, wherein the control unit is adapted to detect a driver's manipulating of a winker and prohibit the tension control based on detection data by the obstacle detecting unit for a predetermined period when the winker is manipulated by the driver.

9. The seatbelt apparatus for the vehicle of claim 1, wherein the control unit is adapted to detect a driver's manipulating of a gear-shift lever and prohibit the tension control based on detection data by the obstacle detecting unit for a predetermined period when the gear-shift lever is manipulated by the driver.

10. The seatbelt apparatus for the vehicle of claim 1, wherein the control unit is adapted to detect a driver's manipulating of a clutch and prohibit the tension control based on detection data by the obstacle detecting unit for a predetermined period when the clutch is manipulated by the driver.

11. A seatbelt apparatus for a vehicle, comprising:
a webbing for restraining a passenger seated on a seat;
a retractor for winding and rewinding the webbing;
a first pretensioner for winding the webbing to the retractor by a first tension;
a second pretensioner for applying a second tension to the webbing in an emergency about the vehicle to restrain the passenger;
manipulated brake detecting means for detecting a manipulated amount of a brake pedal of the vehicle;
obstacle detecting means for detecting an obstacle in front of the vehicle; and
control means for controlling the first tension by the first pretensioner in accordance with at least one of a tension control based on detection data by the manipulated brake detecting means and another tension control based on detection data by the obstacle detecting means,
wherein the control means, under the tension control based on detection data by the manipulated brake detecting means, allows the first pretensioner to always operate when it is judged that the vehicle is braking in an emergency,
the control means, under the tension control based on detection data by the obstacle detecting means, allows the first pretensioner to operate selectively; and the control means is adapted to detect an operation of the passenger and prohibit the tension control based on detection data by the obstacle detecting unit for a predetermined time period.

12. A method for controlling a seatbelt for a vehicle, comprising:
preparing a webbing for restraining a passenger seated on a seat;
detecting a manipulated amount of a brake pedal of the vehicle;
detecting an obstacle in front of the vehicle;
applying a first tension to the webbing under the tension control based on detection data of the manipulated amount of the brake pedal always when it is judged that the vehicle is braking in an emergency;
detecting an operation of the passenger and prohibiting the tension control based on detection data of the obstacle for a predetermined time period;
applying another first tension to the webbing under the tension control based on detection data of the obstacle selectively; and
applying a second tension to the webbing in an emergency about the vehicle to restrain the passenger.

13. A seatbelt apparatus for a vehicle, comprising:
a webbing for restraining a passenger seated on a seat with a first tension or a second tension which is larger than the first tension, the second tension applied to the webbing in an emergency;
a manipulated brake detecting unit for detecting a manipulated amount of a brake pedal of the vehicle;
an obstacle detecting unit for detecting an obstacle in front of the vehicle; and
a control unit for controlling the first tension to the webbing in accordance with at least one of a tension control based on detection data by the manipulated brake detecting unit and another tension control based on detection data by the obstacle detecting unit,
wherein the control unit, under the tension control based on detection data by the manipulated brake detecting unit, always applies the first tension to the webbing when it is judged that the vehicle is braking,
the control unit, under the tension control based on detection data by the obstacle detecting unit, applies the first tension to the webbing selectively; and the control unit is adapted to detect an operation of the passenger and prohibit the tension control based on detection data by the obstacle detecting unit for a predetermined time period.

14. A vehicle comprising a seatbelt apparatus, said seatbelt apparatus comprising:
a webbing for restraining a passenger seated on a seat;
a retractor for winding and rewinding the webbing;
a first pretensioner for winding the webbing to the retractor by a first tension;
a second pretensioner for applying a second tension to the webbing in an emergency about the vehicle to restrain the passenger;
a manipulated brake detecting unit for detecting a manipulated amount of a brake pedal of the vehicle;
an obstacle detecting unit for detecting an obstacle in front of the vehicle; and
a control unit for controlling the first tension by the first pretensioner in accordance with at least one of a tension control based on detection data by the manipulated brake detecting unit and another tension control based on detection data by the obstacle detecting unit,
wherein the control unit, under the tension control based on detection data by the manipulated brake detecting unit, allows the first pretensioner to always operate when it is judged that the vehicle is braking in an emergency, the control unit, under the tension control based on detection data by the obstacle detecting unit, allows the first pretensioner to operate selectively; and the control unit is adapted to detect an operation of the passenger and prohibit the tension control based on detection data by the obstacle detecting unit for a predetermined time period.

15. The vehicle of claim 14, wherein the control unit of the seatbelt apparatus is adapted to detect a driver's braking operation and prohibit the tension control based on detection data by the obstacle detecting unit while a brake pedal is being manipulated by the driver.

16. The vehicle of claim 14, wherein the control unit of the seatbelt apparatus is adapted to detect a driver's accelerating operation and prohibit the tension control based on detection data by the obstacle detecting unit for a predetermined period when an accelerator pedal is manipulated by the driver.

17. The vehicle of claim 14, wherein the control unit of the seatbelt apparatus is adapted to detect a driver's manipulating of a steering wheel and prohibit the tension control based on detection data by the obstacle detecting unit for a predetermined period when the steering wheel is manipulated by the driver.

18. The vehicle of claim 14, wherein the control unit of the seatbelt apparatus is adapted to detect a driver's manipulating of a winker and prohibit the tension control based on detection data by the obstacle detecting unit for a predetermined period when the winker is manipulated by the driver.

19. The vehicle of claim 14, wherein the control unit of the seatbelt apparatus is adapted to detect a driver's manipulating of a gear-shift lever and prohibit the tension control based on detection data by the obstacle detecting unit for a predetermined period when the gear-shift lever is manipulated by the driver.

20. The vehicle of claim 14, wherein the control unit of the seatbelt apparatus is adapted to detect a driver's manipulating of a clutch and prohibit the tension control based on detection data by the obstacle detecting unit for a predetermined period when the clutch is manipulated by the driver.

21. A seatbelt apparatus for a vehicle, comprising:

a webbing for restraining a passenger seated on a seat;

a retractor for winding and rewinding the webbing;

a first pretensioner for winding the webbing to the retractor by a first tension;

a second pretensioner for applying a second tension to the webbing in an emergency about the vehicle to restrain the passenger;

a manipulated brake detecting unit for detecting a manipulated amount of a brake pedal of the vehicle;

an obstacle detecting unit for detecting an obstacle in front of the vehicle; and a control unit for controlling the first tension by the first pretensioner in accordance with at least one of a tension control based on detection data by the manipulated brake detecting unit and another tension control based on detection data by the obstacle detecting unit, wherein the control unit, under the tension control based on detection data by the manipulated brake detecting unit, allows the first pretensioner to always operate when it is judged that the vehicle is braking in an emergency, and the control unit, under the tension control based on detection data by the obstacle detecting unit, is adapted to detect a braking operation of the passenger and prohibit the tension control for a predetermined time period, thereby reducing troublesomeness of the passenger.

* * * * *